US012573789B2

(12) United States Patent
Obermeyer et al.

(10) Patent No.: US 12,573,789 B2
(45) Date of Patent: Mar. 10, 2026

(54) SUBMERSIBLE, HIGH-VOLTAGE ELECTRICAL CONNECTOR

(71) Applicant: Henry K Obermeyer, Wellington, CO (US)

(72) Inventors: Henry K. Obermeyer, Wellington, CO (US); Drew Blais, Fort Collins, CO (US); Erik Kvietkus, Redmond, WA (US); John R. Petersen, Fort Collins, CO (US); Scott J. Dudek, Streamwood, IL (US); Timothy J. Maffei, Greeley, CO (US)

(73) Assignee: Henry K. Obermeyer, Welllington, CO (US)

( * ) Notice: Subject to any disclaimer, the term of this patent is extended or adjusted under 35 U.S.C. 154(b) by 171 days.

(21) Appl. No.: 18/134,297

(22) Filed: Apr. 13, 2023

(65) Prior Publication Data

US 2023/0335943 A1     Oct. 19, 2023

Related U.S. Application Data

(60) Provisional application No. 63/330,735, filed on Apr. 13, 2022.

(51) Int. Cl.
| | |
|---|---|
| *H01R 13/523* | (2006.01) |
| *H01R 13/52* | (2006.01) |
| *H01R 13/533* | (2006.01) |
| *H02K 5/132* | (2006.01) |
| *H02K 7/18* | (2006.01) |

(52) U.S. Cl.
CPC ....... *H01R 13/523* (2013.01); *H01R 13/5202* (2013.01); *H01R 13/533* (2013.01); *H02K 5/132* (2013.01); *H02K 7/1823* (2013.01)

(58) Field of Classification Search
CPC ............. H01R 13/523; H01R 13/5202; H01R 13/533; H02K 5/132; H02K 7/1823
See application file for complete search history.

(56) References Cited

U.S. PATENT DOCUMENTS

| | | | |
|---|---|---|---|
| 4,084,282 A * | 4/1978 | Calvert .................. | A46B 17/06 |
| | | | 15/23 |
| 11,300,093 B2 | 4/2022 | Obermeyer et al. | |
| 2019/0186458 A1* | 6/2019 | Obermeyer ........... | F04D 29/548 |
| 2020/0287318 A1* | 9/2020 | Vassgård ............ | H01R 13/5227 |

FOREIGN PATENT DOCUMENTS

| | | | | |
|---|---|---|---|---|
| KR | 20190110442 A | * | 9/2019 | |
| WO | WO-2010124165 A1 | * | 10/2010 | ........... G02B 6/3817 |

OTHER PUBLICATIONS

KR-20190110442-A_translate (Year: 2019).*
International Search Report and Written Opinion of the International Searching Authority issued in International Application No. PCT/US2023/018500, mailed Jun. 16, 2023, 14 pages.

* cited by examiner

*Primary Examiner* — Tulsidas C Patel
*Assistant Examiner* — Mohammed Ahmed Qureshi

(57) ABSTRACT

A submersible, high-voltage electrical connector that includes a female connector and a male connector. The female connector has an interior chamber and a conduit configured to connect the interior chamber to an evacuation pump. The male connector is configured to fit within the chamber of the female connector. The conduit of the female connector is further configured to, when the male connector and the female connector are mated, substantially evacuate any liquid from the chamber of the female connector.

20 Claims, 23 Drawing Sheets

SECTION A-A

SUBMERSIBLE, HIGH-VOLTAGE ELECTRICAL CONNECTOR

CROSS-REFERENCES TO RELATED APPLICATIONS

This patent application claims the benefit of U.S. provisional application No. 63/330,735 filed Apr. 13, 2022, which is incorporated into the present disclosure by this reference.

TECHNICAL FIELD

The subject matter is related to an apparatus and methods for providing a high-voltage electrical connector that is submersible in water, and, more particularly, to an apparatus and methods for providing a high-voltage electrical connector that is suitable for use with a submersible pump-turbine or a high-capacity submersible pump.

BACKGROUND

A conventional pumped storage facility includes a pump-turbine that is connected to an upper reservoir and a lower reservoir. At certain times, water in the upper reservoir may flow under gravity through the pump-turbine and into the lower reservoir. At such times, the pump-turbine generally functions as a turbine, converting the energy of the flowing water into electricity. At other times, water in the lower reservoir is pumped by the pump-turbine (functioning as a pump) uphill to the upper reservoir so that the cycle can be repeated. When functioning as a pump, the pump-turbine generally requires electrical power to operate. This is normally provided by a motor-generator functioning as a motor that is configured to drive the pump. When the pump-turbine is functioning as a turbine, the motor-generator functions as a generator to generate electricity.

As illustrated in U.S. Pat. No. 11,300,093 ("Reversible Pump-Turbine Installation," issued Apr. 12, 2022), the pump-turbine and motor-generator assembly may be located in a well, a deep vertical hole, between the upper reservoir and the lower reservoir. It should be noted that the purpose of the well is to establish sufficiently high absolute pressure on the low-pressure side of the pump turbine to suppress cavitation. The purpose is not to extract groundwater. Such pump-turbine/motor-generator assemblies are submersible because it is generally required to submerge the pump turbine substantially below tailwater in order to suppress destructive cavitation. Additionally, water at elevated pressure may be introduced below the pump turbine in order to raise it to the top of the well for service and maintenance.

Configurations of the disclosed technology address shortcomings in the prior art.

BRIEF DESCRIPTION OF THE DRAWINGS

FIG. 5a is sectional, elevation view of the submersible electrical connector of FIG. 1. FIG. 5b is a detail view of a portion of FIG. 5a.

FIG. 7a illustrates the female connector of FIG. 3 in isolation. FIG. 7b is a detail view of a portion of FIG. 7a.

FIG. 12b is a sectional view as defined in FIG. 12a.

DETAILED DESCRIPTION

Figures 1, 2:
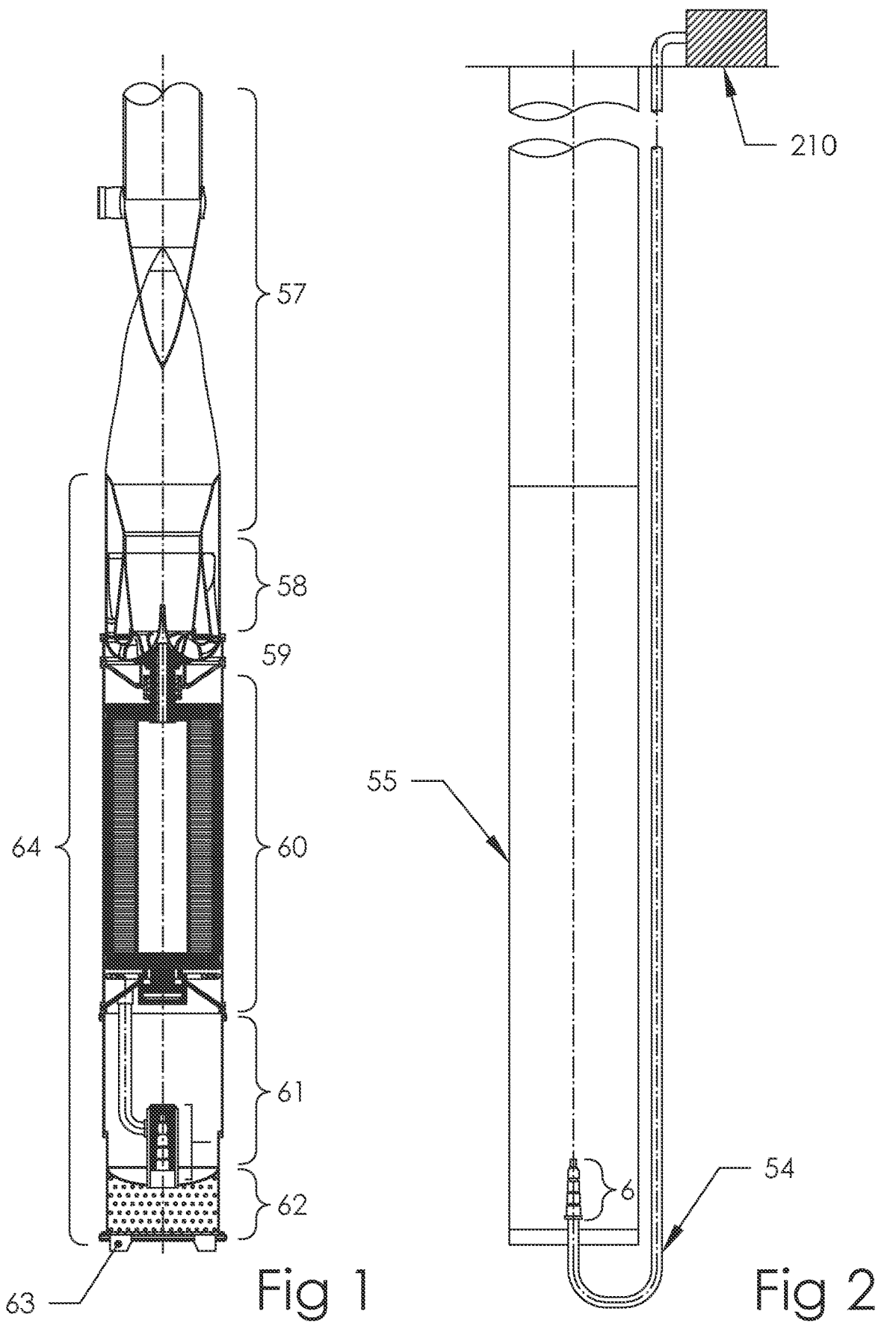
FIG. 1 is a sectional, elevation view of an example of a reversible pump-turbine assembly that includes a submersible electrical connector, according to an example configuration.
FIG. 2 is a sectional, elevation view of a male portion of the submersible electrical connector of FIG. 1 placed within an example well.

As described herein, aspects are directed to a high-voltage electrical connector that is submersible in water. While the focus of the discussion is on using the disclosed technology to connect to submersible, reversible pump-turbine, motor-generator assemblies of the type used for pumped storage systems, the disclosed technology also has useful applications for other submersed connections of a similar nature, such as connectors for recharging batteries of underwater mining equipment, for example.

In the context of a submersible pump-turbine, motor-generator assembly of the type used for pumped storage systems, it is desirable to be able to lower the assembly into a well, a deep vertical hole, and establish the required electrical power, auxiliary power, and control connections for operating the pump-turbine without onerous, manual cable handling and without positioning cables where they would be subject to potentially damaging high velocity water flow. In configurations of the disclosed technology, then, the required connections are established by simply lowering the pump-turbine into the well. Requisite tasks such as pressurizing the female connector with dielectric fluid, cleaning the male connector with a water spray and a powered brush, and drying the male connector with an air knife, can be performed automatically by a controller once the pump-turbine, motor-generator assembly is installed within the well. The conflicting requirements of high contact-pressure required for high current carrying capacity and low contact-pressure, or lack of contact, during mating and de-mating (i.e. disconnecting) of the male and female connectors may be addressed with inflatable annular actuators, for example. In addition, the electrical connector must withstand, and exclude, high-pressure water within the well.

In configurations, low-voltage auxiliary power, which may be three-phase 480 VAC for example, may be safely and reliably isolated from high-voltage power, which may be 36 kV for example, by incorporating a three-phase transformer into the connector. In such configurations, only a magnetic flux passes between the male and female connectors, eliminating the need for a low-voltage electrical terminal (for the low-voltage auxiliary power) and a high-voltage electrical terminal (for the high-voltage power) within the same connector.

This greatly reduces the possibility of inadvertently feeding high voltage into the auxiliary power circuits, which might occur should the dielectric medium surrounding the contacts break down, or should water ingress occur. The three-phase transformer provides positive (limited only by the dielectric strength of the transformer pole electrical shielding) electrical isolation between the low-voltage and the high-voltage circuits. The conductors leading to the transformer primary circuit in the electrical connector plug (i.e. the male connector 2) would be shielded from high voltage by a grounded conductive metal conduit. The conductors leading from the transformer secondary circuit would likewise be shielded from the nearby high-voltage conductors within a grounded conduit.

In configurations, data signals may be isolated from the high-voltage power by transmitting and connecting the data through optical signals. For the low data rates required for machine monitoring and control, a simple fiber optic connection, for example, is sufficient.

A submersible pump-turbine, or high-capacity submersible pump, should be torsionally restrained at the bottom of the well, preferably with zero backlash. This may result in an inflexible mount of the machine relative to the well. It is thus desirable to flexibly mount either the male or female electrical connector, preferably the male electrical connector. Compliance in the horizontal plane is most important. Excessive angular compliance relative to vertical is not desirable because it could result in misalignment of the male and female connectors during insertion. In order to provide sufficient (for example, at least several inches) horizontal movement while maintaining vertical alignment of the male connector, a set of bridge bearing pads may be provided. In a typical prior-art submersible pump installation, a flexible electrical connection is provided by an electrical cable within the well casing.

Figures 3, 4:
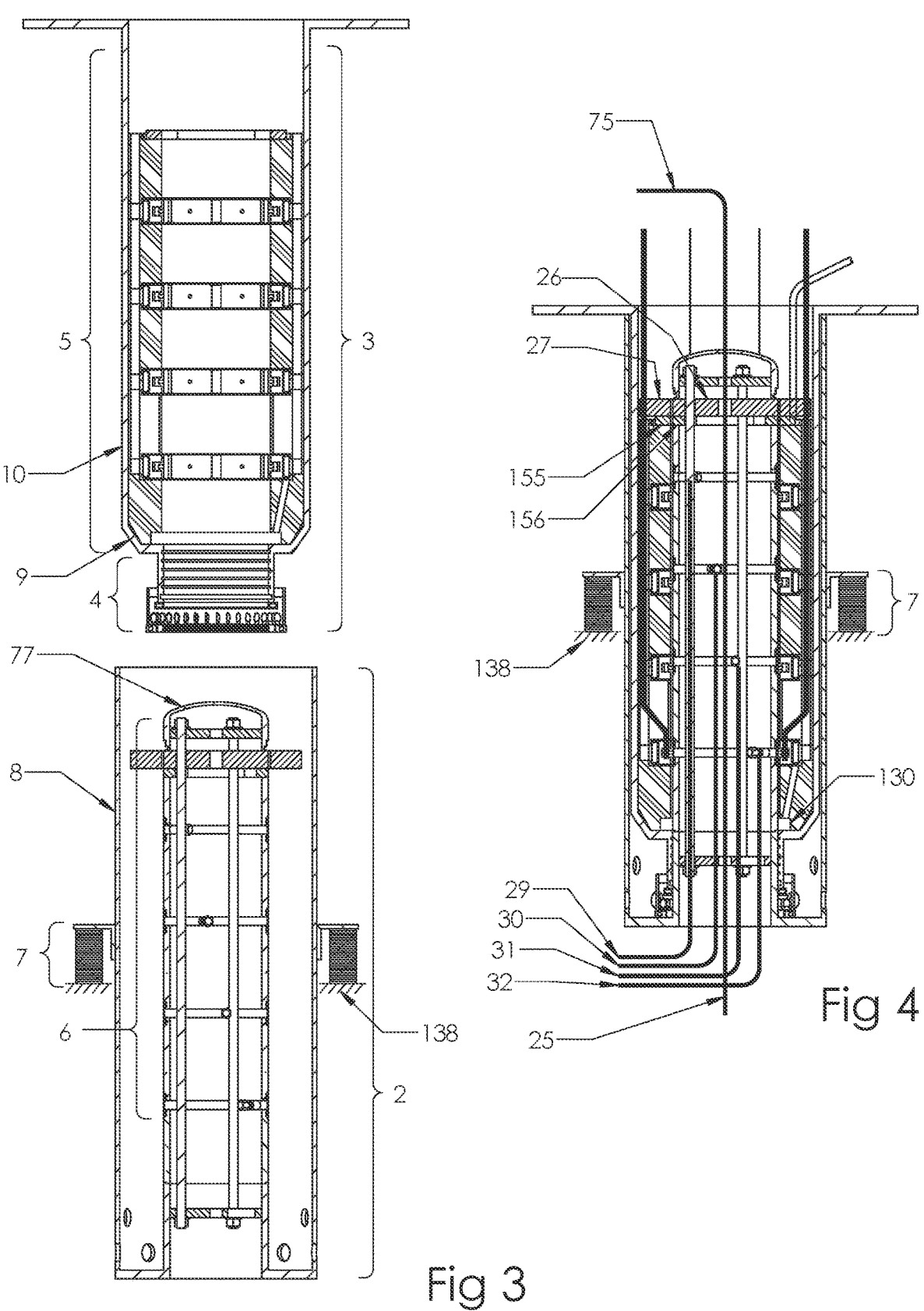
FIG. 3 is a sectional, elevation view of the male portion and the female portion of the submersible electrical connector of FIG. 1, illustrated in an unmated configuration where there is no electrical connection between the male portion and the female portion of the submersible electrical connector.
FIG. 4 is a sectional, elevation view of the male portion and female portion of the submersible electrical connector of FIG. 1, illustrated in a mated configuration where there is an electrical connection between the male portion and the female portion of the submersible electrical connector.

FIG. 1 is a sectional, elevation view showing portions of an example of a reversible pump-turbine assembly, including a submersible electrical connector, according to an example configuration. FIG. 2 is a sectional, elevation view of a male portion of the submersible electrical connector of FIG. 1 placed within an example well. FIG. 3 is a sectional, elevation view of the male portion and the female portion of the submersible electrical connector of FIG. 1, illustrated in an unmated configuration, or disengaged state, where there is no electrical connection between the male portion and the female portion of the submersible electrical connector. As illustrated in FIGS. 1-3, a pump-turbine, motor-generator assembly 64 may include a diffuser 58, a runner 59, a generator 60, an auxiliary equipment enclosure 61, an auxiliary equipment enclosure extension 62, and a submersible electrical connector that includes a male connector 2 and a female connector 3. A flow inverter 57 may be utilized at the top of a pump-turbine diffuser 58. Torque keys 63 at the bottom of the auxiliary equipment enclosure 61 lock the unit in place when it is installed in the well 55.

As illustrated, the pump-turbine, motor-generator assembly 64 is configured to be installed into well 65 such that the male connector 2 of the submersible electrical connector mates with the female connector 3 of the submersible electrical connector. This allows electrical power to be transferred between an electrical junction 210 that is external to the well 55 and the pump-turbine, motor-generator assembly 64 via an electrical conduit 54. The provision of a reliable, waterproof connector allows for installation, removal, and servicing of the pump-turbine, motor-generator assembly 64 without the need to manually disconnect or handle electrical cables. As illustrated, the male connector 2 and the female connector 3 of the submersible electrical connector couple by the action of inserting the pump-turbine, motor-generator assembly 64 into the well and decouple by the action of removing the pump-turbine, motor-generator assembly 64 from the well, with the male connector 2 remaining in the well 55 after the pump-turbine, motor-generator assembly 64 has been removed from the well 55.

The male connector 2 is substantially cylindrical, and the female connector 3 includes an interior chamber that is substantially cylindrical. As used in this context, "substantially cylindrical" means largely or essentially having the form of a right circular cylinder without requiring perfect cylindricality. The drawings show examples of a male connector 2 that is substantially cylindrical and a female connector 3 that includes an interior chamber that is substantially cylindrical.

Pump-turbines, such as found in the pump-turbine, motor-generator assembly 64 of FIG. 1, typically have ratings of 50

MW or greater. This results in the need for an electrical connector of greater rating than provided by the prior art. The metal-to-metal contact area of each terminal of the connector depends on the contact pressure. Excessive contact pressure could result in excessive wear during mating and de-mating and would generate electrically conductive wear material. Embodiments of the disclosed technology are configured to release or reduce the contact pressure during mating and de-mating to reduce wear and to reduce the generation of electrically conductive wear material.

With particular reference to FIG. 3, the male connector 2 and the female connector 3 are shown in a disengaged state. The female connector 3 includes a cleaning and sealing assembly 4 and a main body 5 of the female connector 3. The outside diameter 10 of the main body 5 of the female connector 3 engages with a sheath 8 of the male connector 2. This provides mechanical alignment between the male connector 2 and female connector 3 before the male connector core 6 engages with the female connector 3. Compliance of the male connector 2 is achieved by elastomeric bridge bearings 7 mounted to a fixed structure 138. A male connector cover 77 seals the top of the male connector core 6.

Figures 11A, 11B:
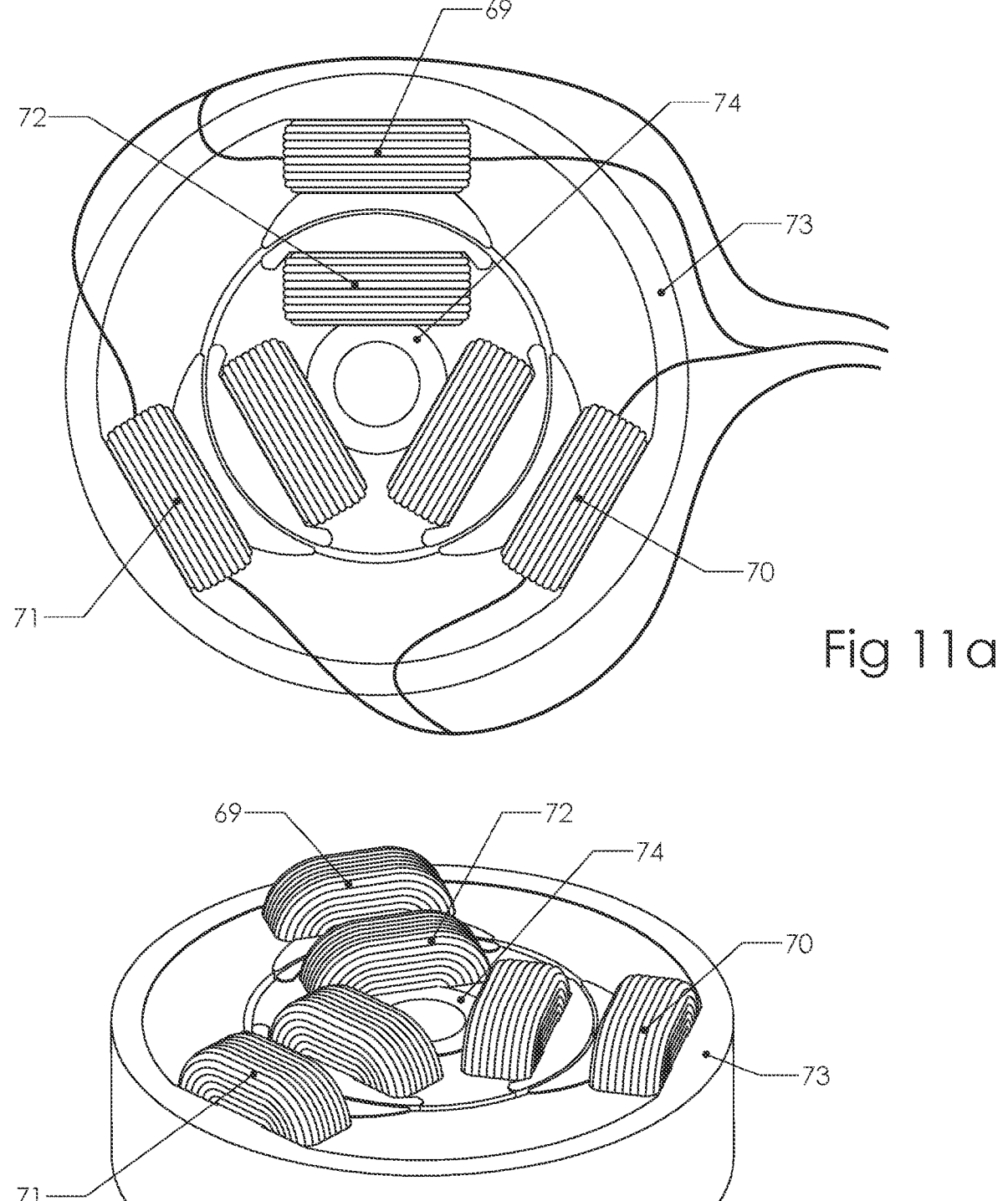
FIG. 11a is a top view and FIG. 11b is an isometric view of an example three-phase transformer to inductively couple power from the male connector to the female connector, according to an example configuration.

FIG. 4 is a sectional, elevation view of the male connector 2 and the female connector 3 of the submersible electrical connector of FIG. 1, illustrated in a mated configuration where there is an electrical connection between the male connector 2 and the female connector 3. As illustrated in FIG. 4, a male connector transformer element 27 transfers power via an alternating magnetic field to a female connector transformer element 26. Note that the transformer elements are simply shown schematically in FIG. 4. A more detailed rendering of examples of these transformer elements are shown in FIGS. 11a and 11b.

Figure 12A:
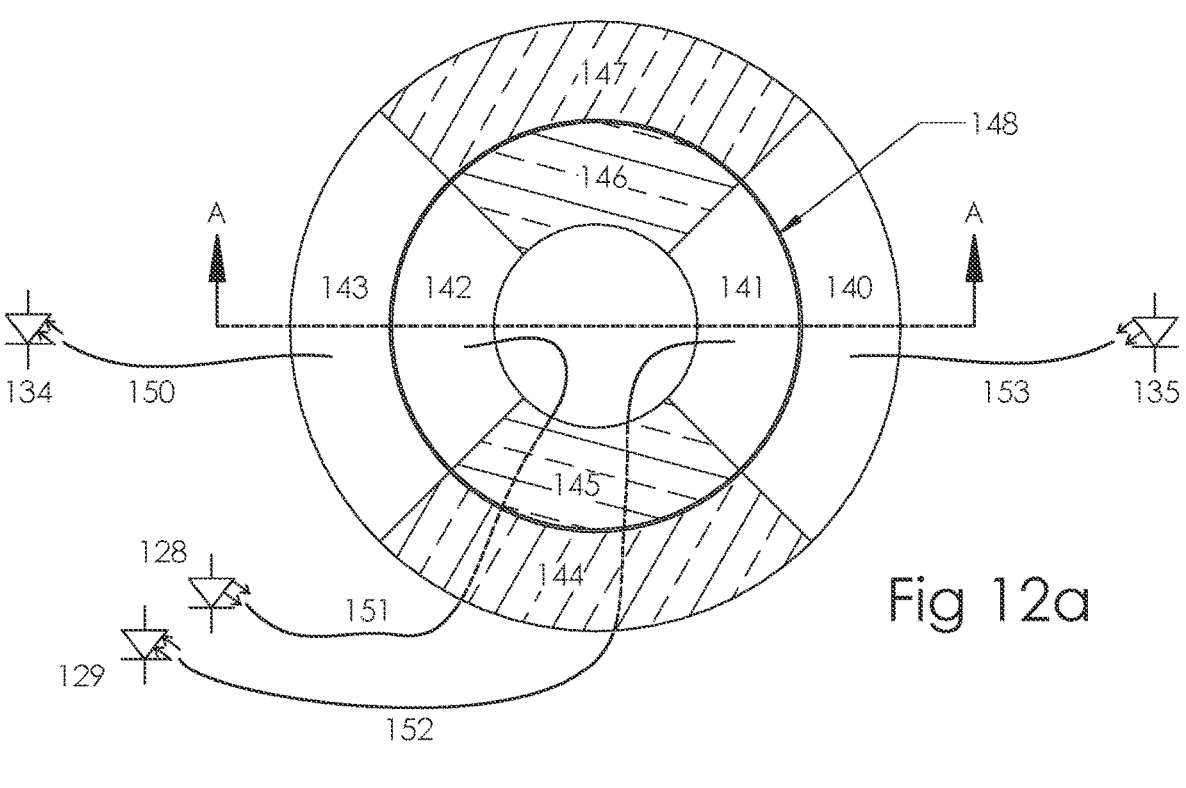
FIG. 12a illustrates an example of a two-way optical data link connecting through the submersible high voltage electrical connector.
Figure 12B:
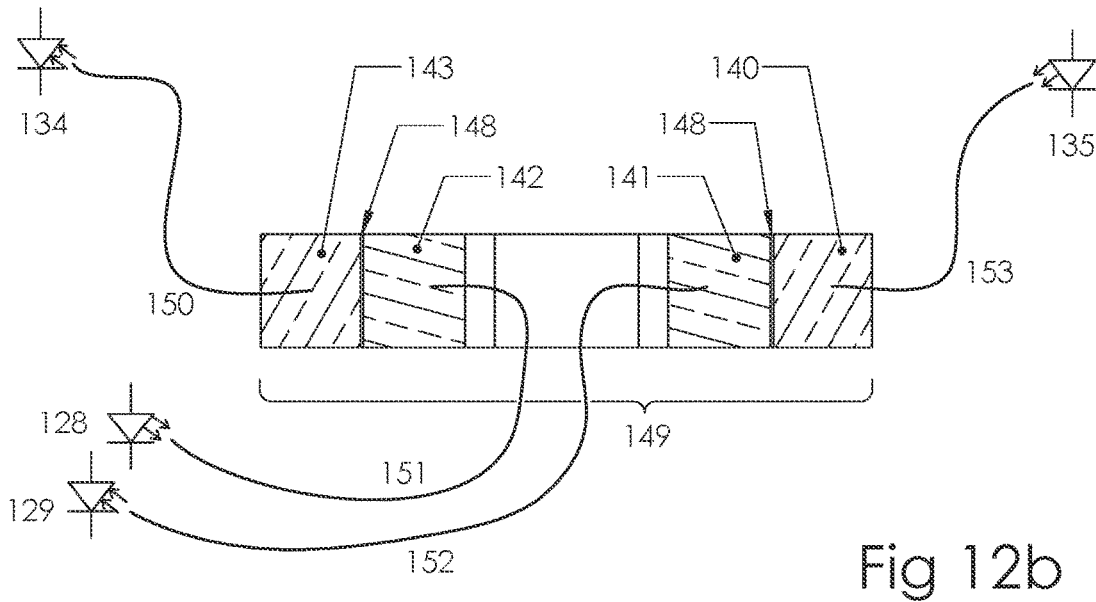

The configuration illustrated in FIG. 4 is configured to transfer three-phase "station service power" to equipment within the auxiliary equipment enclosure 61 of FIG. 1. Such equipment might include dewatering pumps, dehumidifiers, oil filtration pumps, hydraulic pumps, water pumps, battery chargers, control systems, and the like. It is safer to use magnetic coupling for ancillary 480 volt power, for example, rather than additional terminals in order to avoid the risk of high voltage reaching the low-voltage terminals. Male connector optical data element 156 communicates with female optical data element 155. FIGS. 12a and 12b show more details of an example optical data unit. Optical data transmission reduces the risk of high-voltage and high current lines interfering with low-voltage signals. A lower level connection 130 may be used to retrieve dielectric fluid if used (as discussed below).

Figures 5A, 5B:
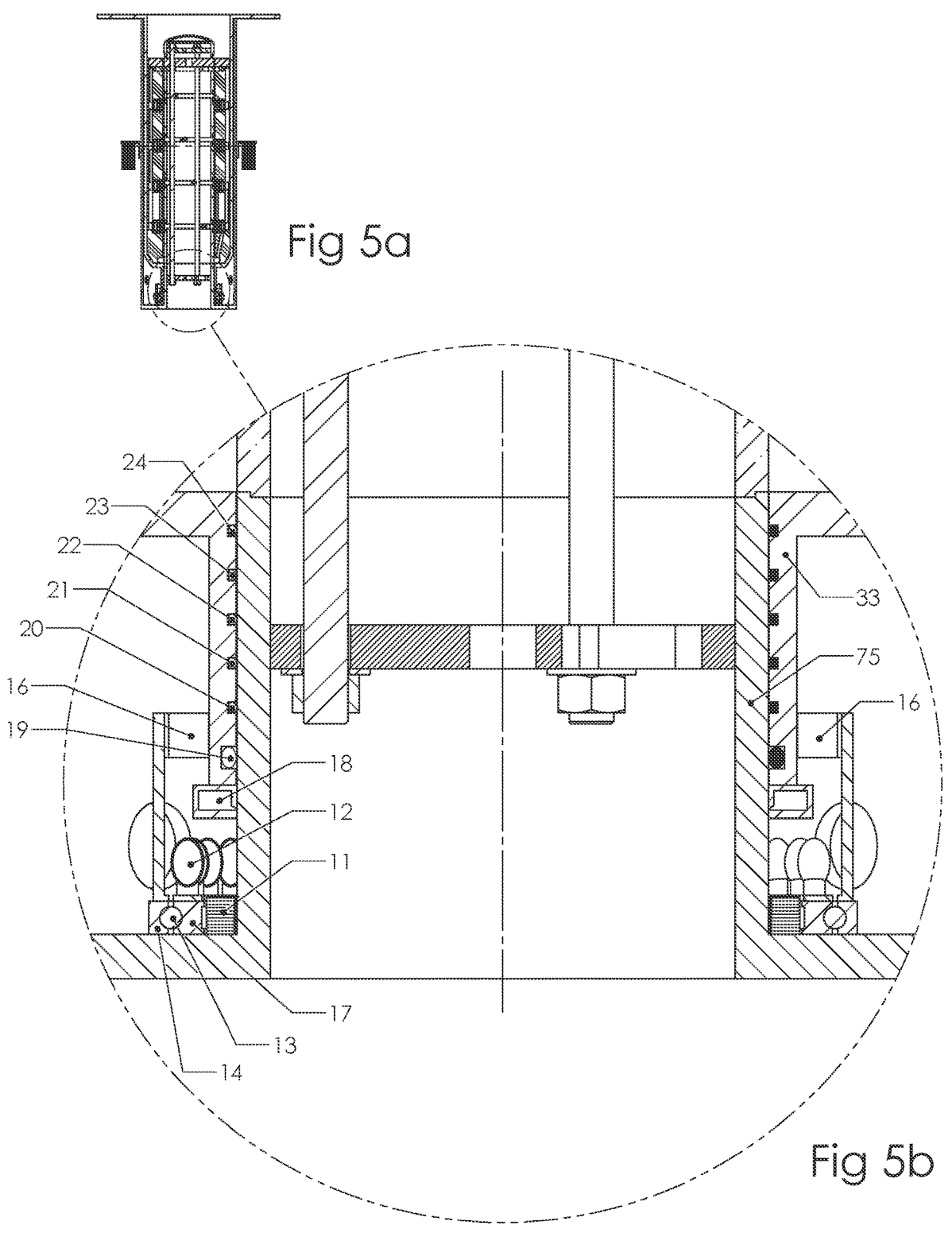
Figure 8A:
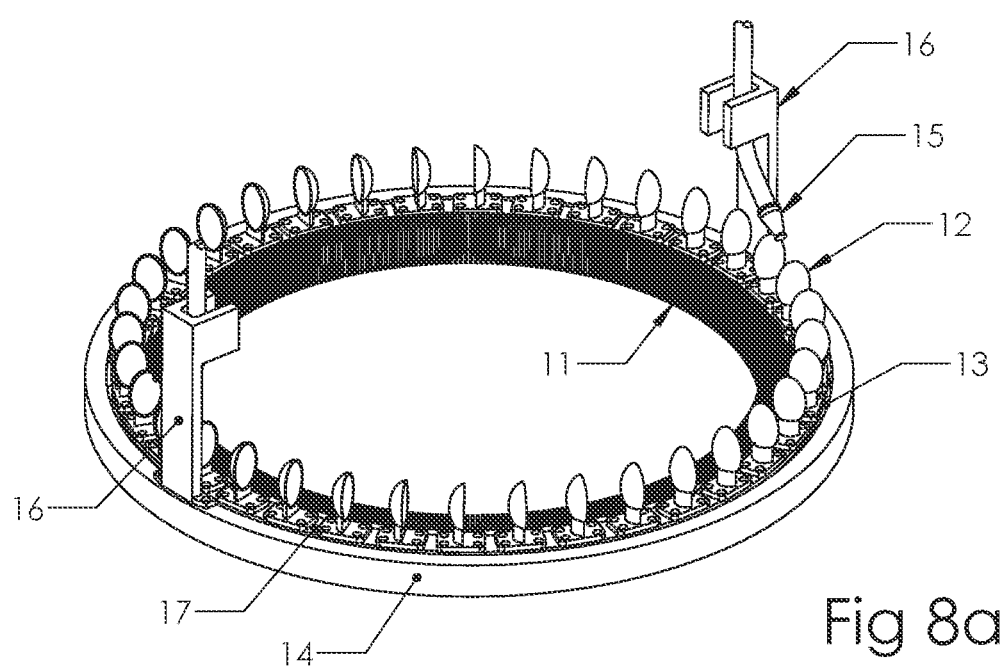
FIG. 8a is an isometric view and FIG. 8b is a top view of the water-pressure-powered rotary brush of FIG. 5a in isolation.
Figure 8B:
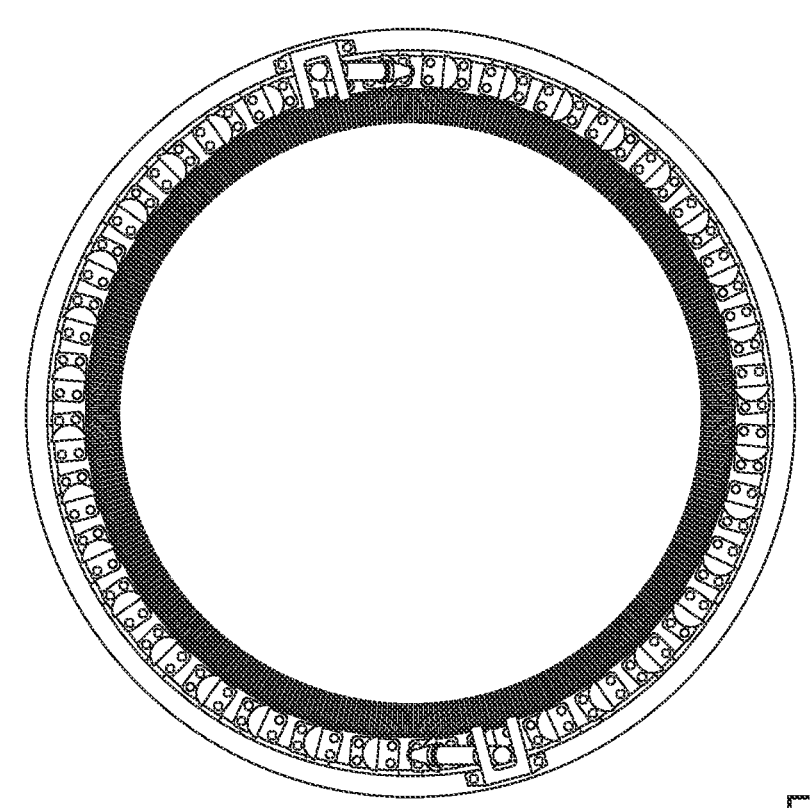

FIG. 5a is sectional, elevation view of the submersible electrical connector of FIG. 1. FIG. 5b is a detail view of a portion of FIG. 5a. FIG. 8a is an isometric view and FIG. 8b is a top view of the water-pressure-powered rotary brush of FIG. 5a in isolation. As illustrated in FIG. 5b and FIG. 8a, a rotary brush 11 for cleaning the male connector 2 extends 360 degrees around the perimeter of the male terminal assembly 75 is shown. This brush 11 is powered by impulse turbine buckets 12 which are in turn powered by one or more water jets 15. The water jets 15 are connected to a water source, such as a pressure tank or a battery driven pump with a reservoir within the auxiliary equipment enclosure 61. A limited operating time and a limited volume of water would typically be sufficient to remove debris from the male connector 2. The combined cleaning effect of the rotary brush 11 and flowing water from the water source serves to reduce the risk of hydroscopic fibrous material being present between the male connector 2 and the female connector 3, which could cause a short circuit between high-voltage terminals. As illustrated, the rotary brush 11 is attached to an inner race 17 of a ball bearing assembly that also includes ball bearings 13 and an outer race 14. The outer race 14 is held in place by structural support 16. Preferably, either the ball bearings 13 or the inner race 17 and the outer race 14 are elastomeric. When compared to rigid components, an advantage of the elastomeric components is that they deform to accommodate sand particles or other debris, for example, while rigid components of a ball bearing assembly may instead lock up and not permit the ball bearings themselves to roll.

An air knife 18 is supplied with compressed air during the mating process and serves to keep water away from the terminals above. The air knife 18 may be, for example, connected to a compressed air source that can be activated when needed. The air knife 18 may be used to clean the male connector as well as to dry and clean the exterior of the protective cap 78 (discussed below) as the receptacle 3 is lowered over it. A lip seal 19 serves as a redundant barrier to water and debris.

Elastomeric seals 20, 21, 22, 23, and 24 serve to occlude debris and also allow a vacuum to be established between the male connector 2 and the female connector 3 when mated for the purpose of removing any residual water. These same elastomeric seals 20, 21, 22, 23, and 24 also serve to contain a dielectric fluid or gas that may be used to electrically isolate the terminals from each other. Elastomeric seals 20, 21, 22, 23, and 24 may be, for example, O-rings. Referring to FIG. 4, conduit 75 serves to convey water from between the male connector 2 and female connector 3 when, for example, the conduit 75 is connected to an evacuation pump. Accordingly, via the evacuation pump and the conduit 75, the female connector 3 is configured to, when the male connector 2 and the female connector 3 are mated, substantially evacuate any liquid from the chamber of the female connector 3 into which the male connector 2 is fitted. As used in this context, "substantially evacuate" means largely or essentially to empty, without requiring absolute removal of all liquid from between the male connector 2 and female connector 3. The conduit 75 may also introduce dielectric fluid between the male connector 2 and female connector 3 when, for example, the conduit 75 is connected to a dielectric fluid reservoir. Accordingly, the female connector 3 is configured to connect the interior chamber of the female connector 3 to a dielectric-fluid supply, and the conduit of the female connector further configured to, when the male connector and the female connector are mated, substantially fill with dielectric fluid the interior chamber of the female connector 3 into which the male connector 2 is fitted. As used in this context], "substantially fill" means largely or essentially to make full, without requiring the entire capacity to be completely occupied with dielectric fluid. The evacuation pump and the dielectric fluid reservoir may be located, for example, within the auxiliary equipment enclosure 61.

Figures 6A, 6B, 6C, 6D, 6E, 6F, 6G:
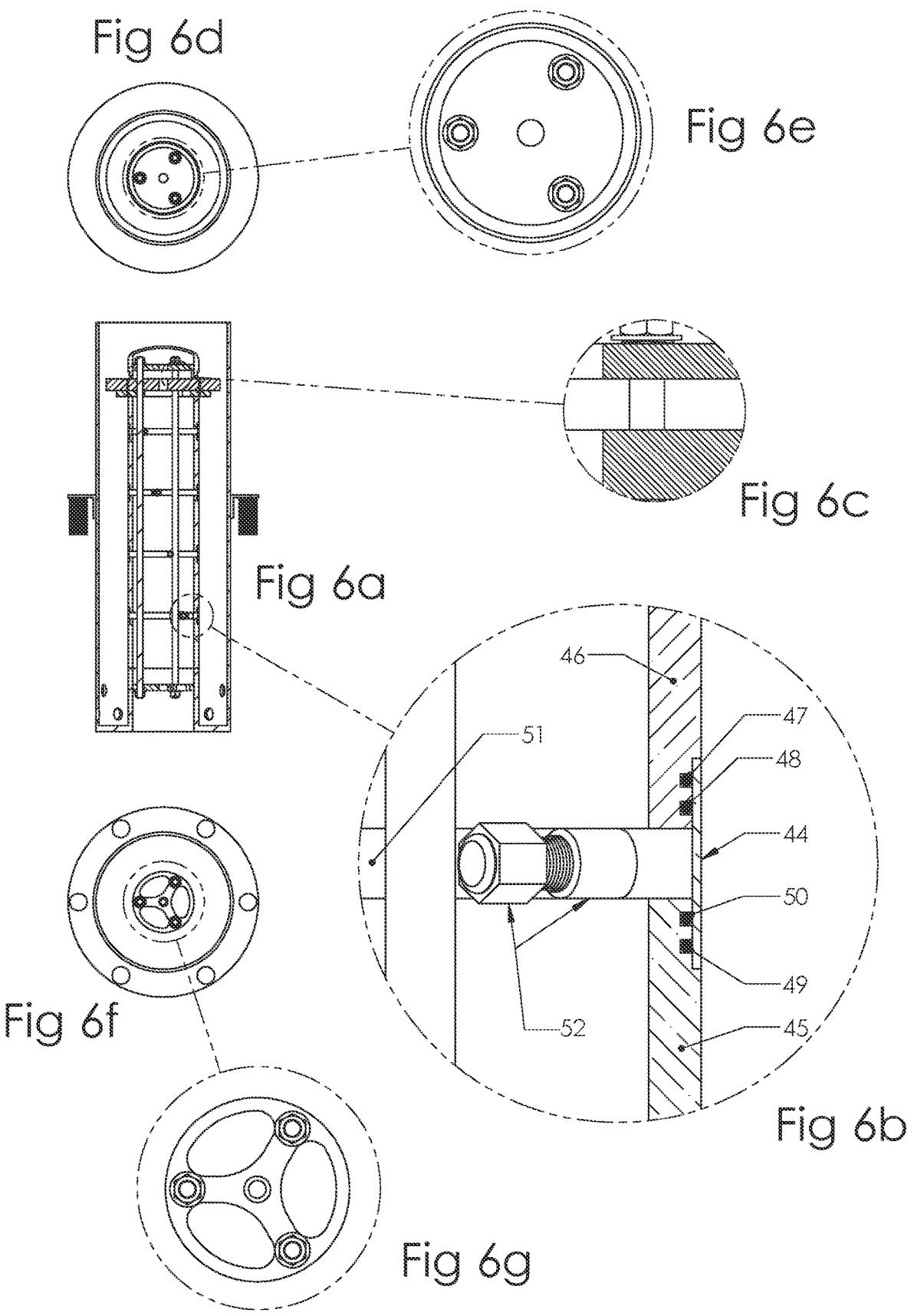
FIG. 6a illustrates the male connector of FIG. 3 in isolation.
FIG. 6b is a detail view of a portion of FIG. 6a as shown.
FIG. 6c is a detail view of a portion of FIG. 6a as shown.
FIG. 6d is the top view of FIG. 6a, and FIG. 6e is a detail view of a portion of FIG. 6d as shown.
FIG. 6f is the bottom view of FIG. 6a, and FIG. 6g is a detail view of a portion of FIG. 6f as shown.

FIG. 6a illustrates the male connector of FIG. 3 in isolation. FIG. 6b is a detail view of a portion of FIG. 6a. As illustrated in FIGS. 6a and 6b, a male connector terminal 44 is sealed to insulating spacers 45 and 46 with elastomeric seals 47, 48, 49, and 50, which may be, for example, O-rings. Cable lug 52 is attached to the male connector terminal 44 inside diameter. The male connector terminals 44 may be held securely to insulating spacers 45 and 46 by tie rods 131 on the interior of the male connector. The tie rods 131 may be made from, for example, fiberglass. The tie rods 131 may be kept under constant tension over a wide range of operating temperatures by use of wave springs 132, for example, under the tie rod nuts 133. Glazed ceramic is the preferred material for spacers 45 and 46 on account of ease of cleaning and lack of surface porosity.

Figures 7A, 7B:
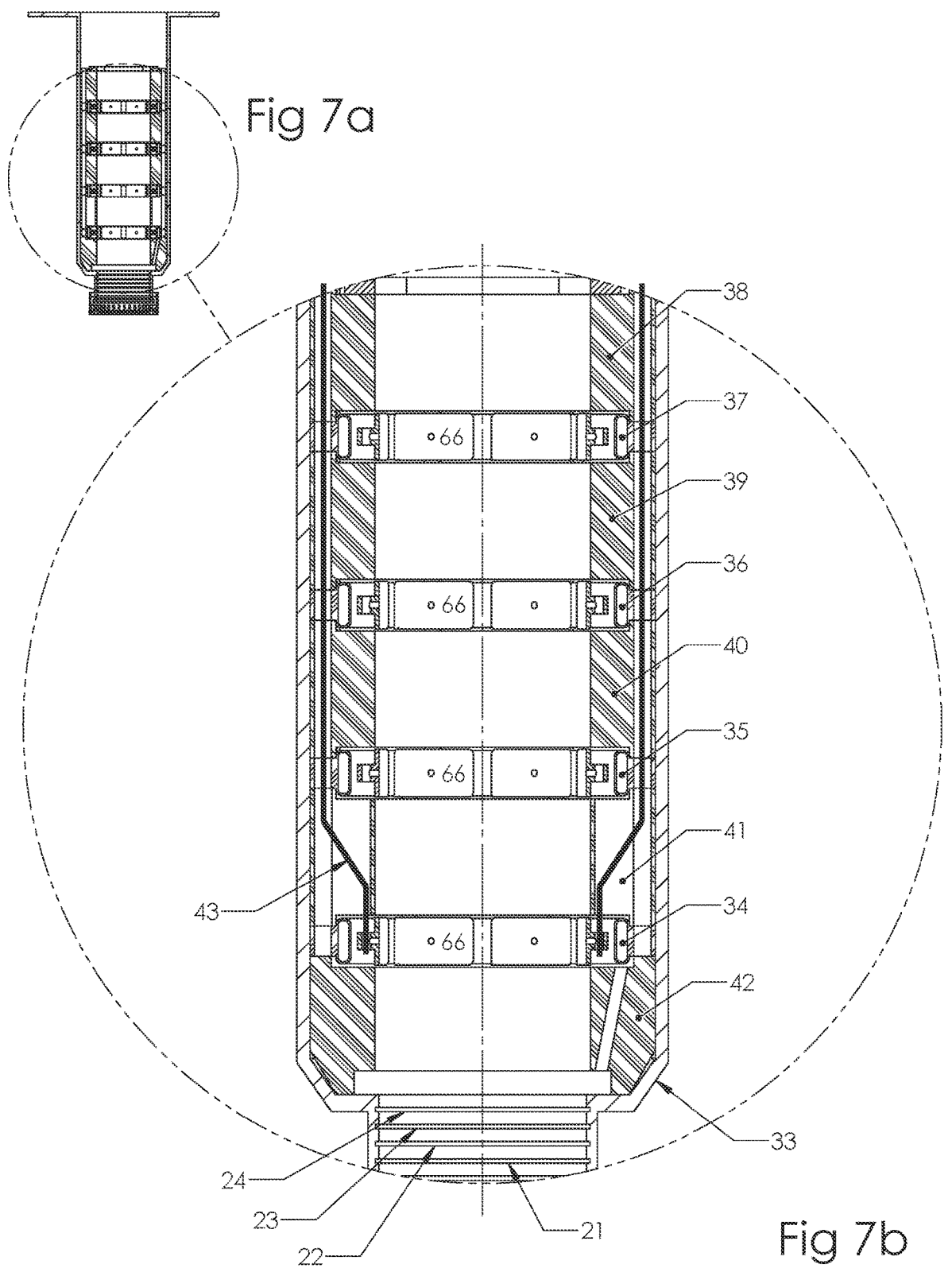

FIG. 7a illustrates the electrical connector receptacle, or female connector 3, of FIG. 3 in isolation. FIG. 7b is a detail view of portion of FIG. 7a. As illustrated in FIG. 7b, elastomeric seals 21, 22, 23, and 24 provide a seal against water intrusion. Spacers 38, 39, 40, 41, and 42 electrically isolate and mechanically support electrical receptacle contacts 66 and inflatable actuators 34, 35, 36, and 37. The electrical receptacle contacts 66 substantially encircle the male connector when the male connector is mated to the female connector. As used in this context, "substantially encircle" means largely or essentially extending around, without requiring a complete circle. Electrical conductor 43 is shown, by way of example, connected to one of the electrical receptacle contacts 66. Additional electrical conductors, consisting of stranded and insulated electrical wire for example, would connect to each electrical receptacle contact 66. All of the electrical conductors are not illustrated to not clutter FIG. 7b.

As illustrated, the electrical receptacle contacts 66 are configured to increase in circumference to reduce the contact pressure between the electrical receptacle contacts 66 and the male connector 2 during mating and decoupling of the male connector 2 and the female connector 3. The electrical receptacle contacts 66 is also configured to reduce in circumference to increase contact pressure between the electrical receptacle contacts 66 and the male connector 2 when the male connector 2 and the female connector 3 are mated. For example, the corresponding inflatable actuator 34, 35, 36, or 37 may expand or contract to transition the electrical receptacle contact 66 between a reduced circumference configuration and an increased circumference configuration.

FIG. 8a is an isometric view and FIG. 8b is a top view of the water-pressure-powered rotary brush of FIG. 5a in isolation. As illustrated in FIGS. 8a and 8b, rotary brush 11 is supported on ball bearings 13 that support inner race 17 relative to outer race 14. The outer race 14 is held in place by structural support 16. Brush 11 is powered by impulse turbine buckets 12 which are in turn powered by one or more water jets 15 receiving water from a pressurized tank in the auxiliary enclosure.

Figure 9:
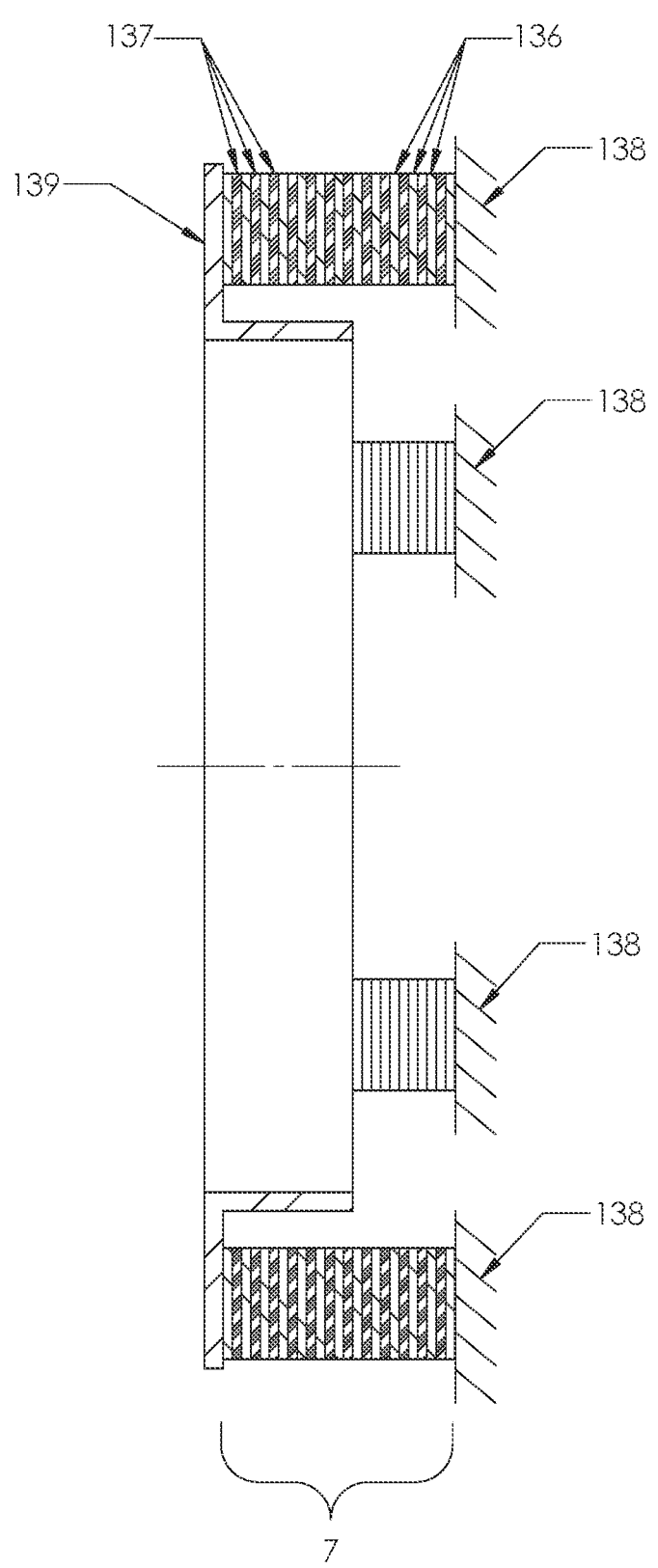
FIG. 9 illustrates the configuration of bridge bearing type support that may be used to position the male connector.

FIG. 9 illustrates an example of a bridge-bearing-type support that may be used to position the male connector. As noted above, with respect to the relative positioning of the male connector 2 and the female connector 3, alignment in the horizontal plane is the most important. Accordingly, excessive angular compliance relative to vertical is not desirable because it could result in misalignment of the male connector 2 and the female connector 3 during insertion. To provide sufficient (for example, at least several inches) horizontal movement while maintaining vertical alignment of the male connector 2, a set of elastomeric bridge bearing supports 7 may be provided. As illustrated in FIG. 9, the elastomeric bridge bearing supports 7 include a stack of alternating steel disks 136 and elastomeric disks 137. The elastomeric disks 137 provide shear compliance, allowing translation between the male connector support 139 and a fixed surface 138. Each pad provides high stiffness in the vertical direction but is compliant in shear to horizontal movement. An arrangement of at least three pads is preferred because it provides exact angular constraint of the male connector. In conjunction with such a compliantly mounted male connector, flexible electrical conductors in the form of stranded copper cables, for example, would be used.

Figure 10:
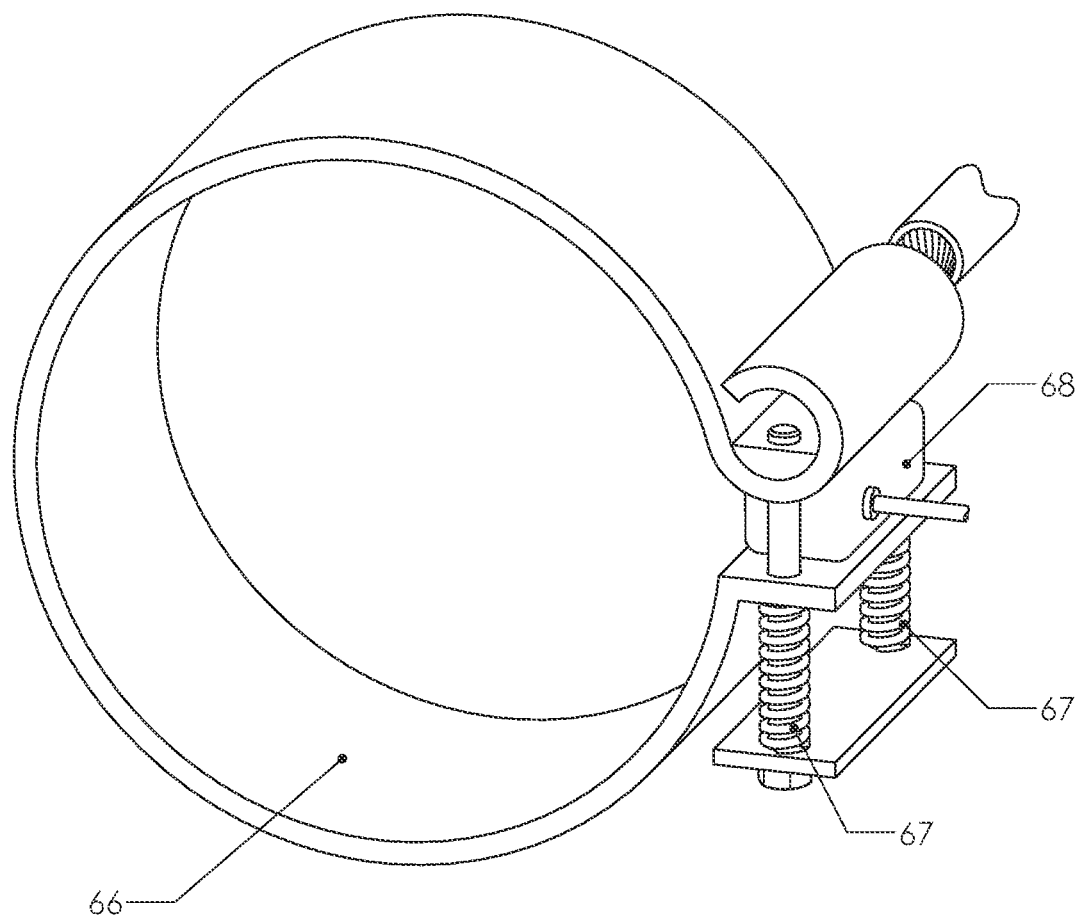
FIG. 10 illustrates an example of a terminal for the female connector that features an inflatable air actuator for loosening the terminal in conjunction with springs for tightening the terminal, each according to example configurations.

FIG. 10 illustrates an example of a terminal for the female connector that features an inflatable air actuator for loosening the terminal in conjunction with springs for tightening the terminal, each according to example configurations. As an alternative to what is shown in FIGS. 7a and 7b, as illustrated in FIG. 10, springs 67 may be used to tighten terminal 66 when the connector is mated, while inflatable actuator 68 is used to relieve the spring pressure and loosen the terminal during mating and de-mating. As illustrated, inflatable actuator 68 is configured to expand to loosen the terminal 66 and is configured to deflate to tighten the terminal 66.

FIG. 11a is a top view and FIG. 11b is an isometric view of an example three-phase transformer to inductively couple power from the male connector to the female connector, according to an example configuration. As illustrated in FIGS. 11 and 12, female connector coils 69, 70, and 71 induce a magnetic field in male connector core 72, female connector core 73, and across dielectric gap 74. The configuration illustrated is configured to transfer three-phase "station service power" to equipment in auxiliary equipment enclosure 61 of FIG. 1.

FIG. 12a illustrates an example of a two-way optical data link connecting through the submersible high voltage electrical connector. FIG. 12b is a sectional view as defined in FIG. 12a. As illustrated in FIGS. 12a and 12b, data from within the auxiliary equipment enclosure is carried from a photo-emitter 135, which may be one or more light emitting diodes, into the electrical connector receptacle through optical fiber 153. Data exits optical fiber 153 into electrical connector receptacle window 140, then crosses gap 148 into electrical connector plug window 141 where it is further carried into optical fiber 152 and on to photodetector(s) 129. Likewise, data from a control facility external to the well may be transmitted by photo-emitter 128, carried by optical fiber 151 to window 142 from where it may cross gap 148 into window 143, from which it may be carried by optical fiber 150 to photoreceptor 134. Photo-emitters 128 and 135 and photodetectors 129 and 134 are preferably located at a safe distance from any high-voltage conductors or devices. In this manner the high-voltage electrical connector may be also used to carry data in both directions without locating sensitive low-voltage electrical circuits or wires adjacent to high-voltage or high currents. This greatly reduces or eliminates the risk of low-voltage circuits being energized with high-voltage, greatly reduces or eliminates induced noise on low-voltage signal circuits, and thereby provides a safer and more reliable system. Gap 148 may be filled with the same gaseous or liquid dielectric that may fill the electrical connector receptacle, or it may be filled with a transparent elastomer with an index of refraction similar to that of windows 140, 141, 142, and 143 in order to minimize signal loss due to reflections at gap 148.

Figure 13:
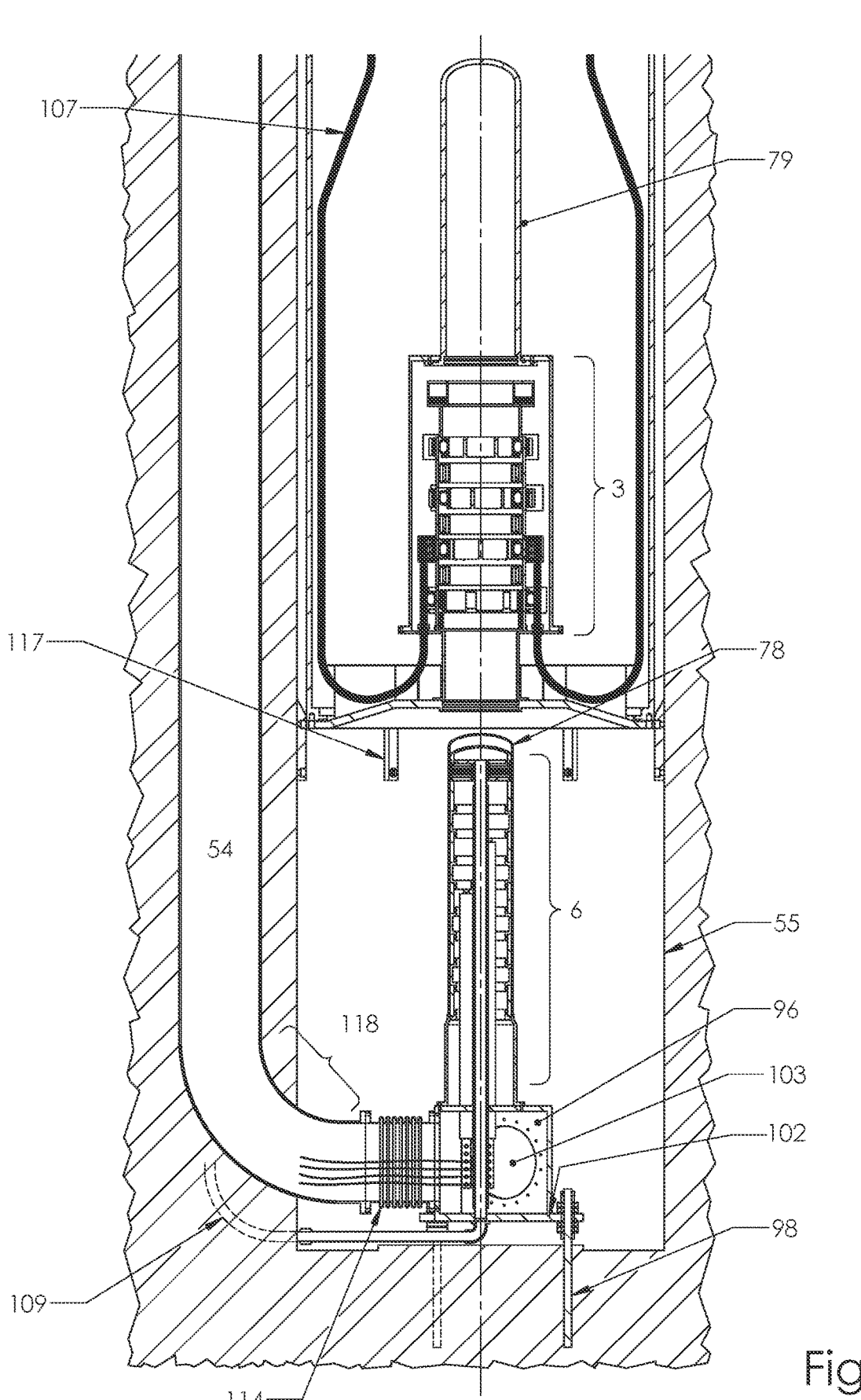
FIG. 13 is sectional elevation of the electrical connector where the connector is not engaged.
Figure 14:
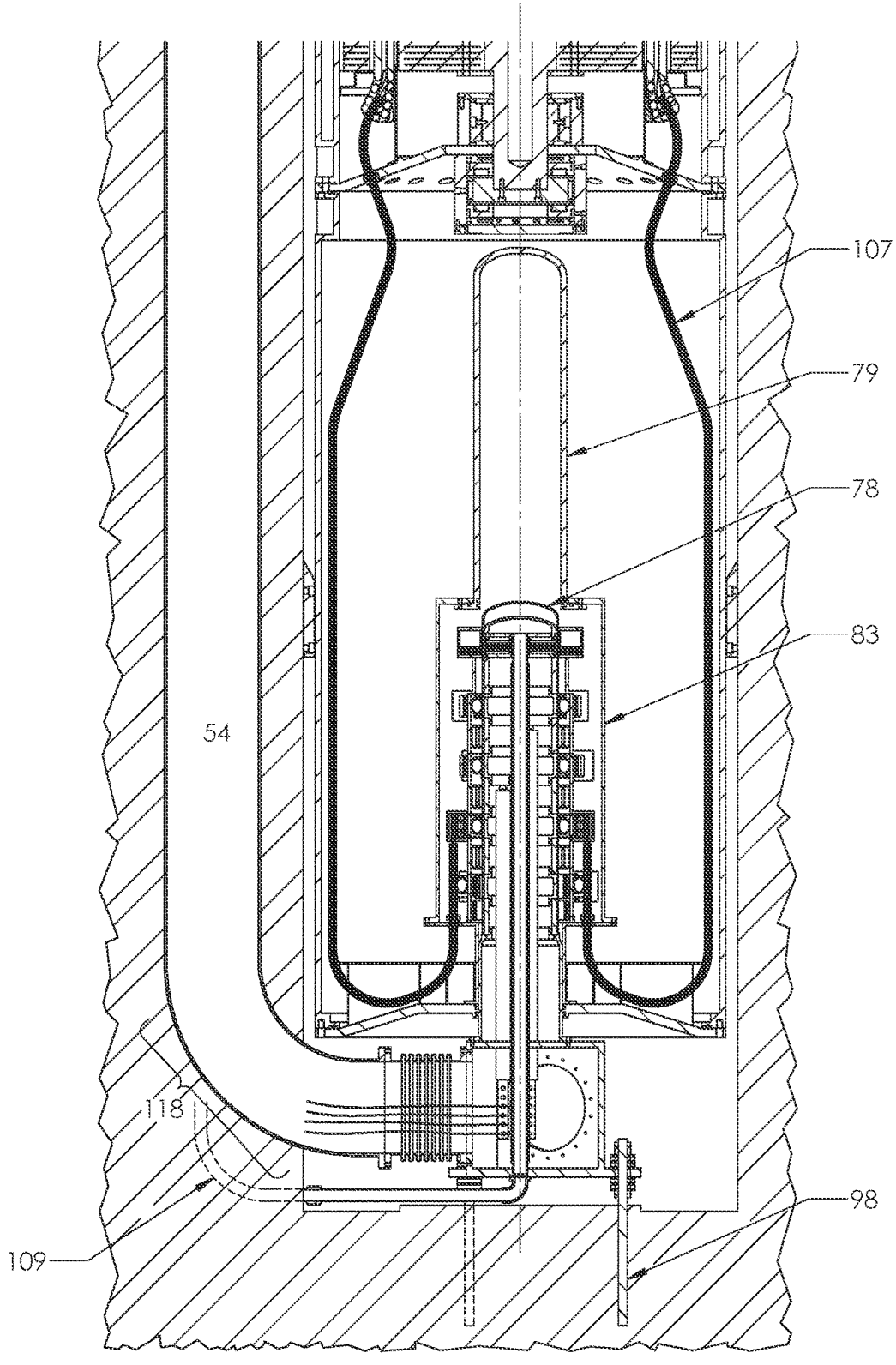
FIG. 14 is a section elevation of the electrical connector where the connector is partially engaged. The protective cover for the male connector is still surrounding the male connector.
Figure 15:
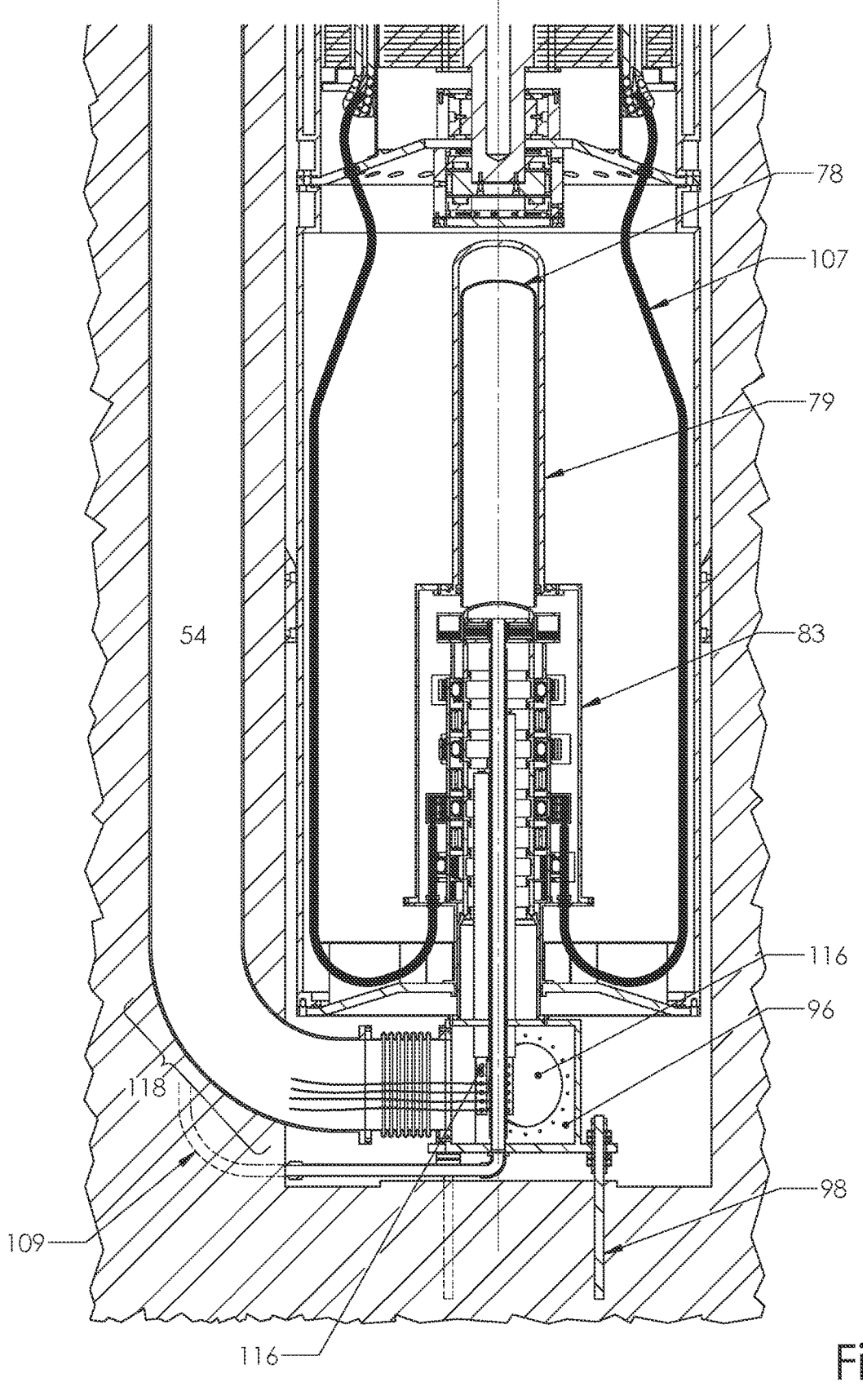
FIGS. 15, 16 and 17 are section elevation views of the electrical connector where the connector is fully engaged.
Figure 16:
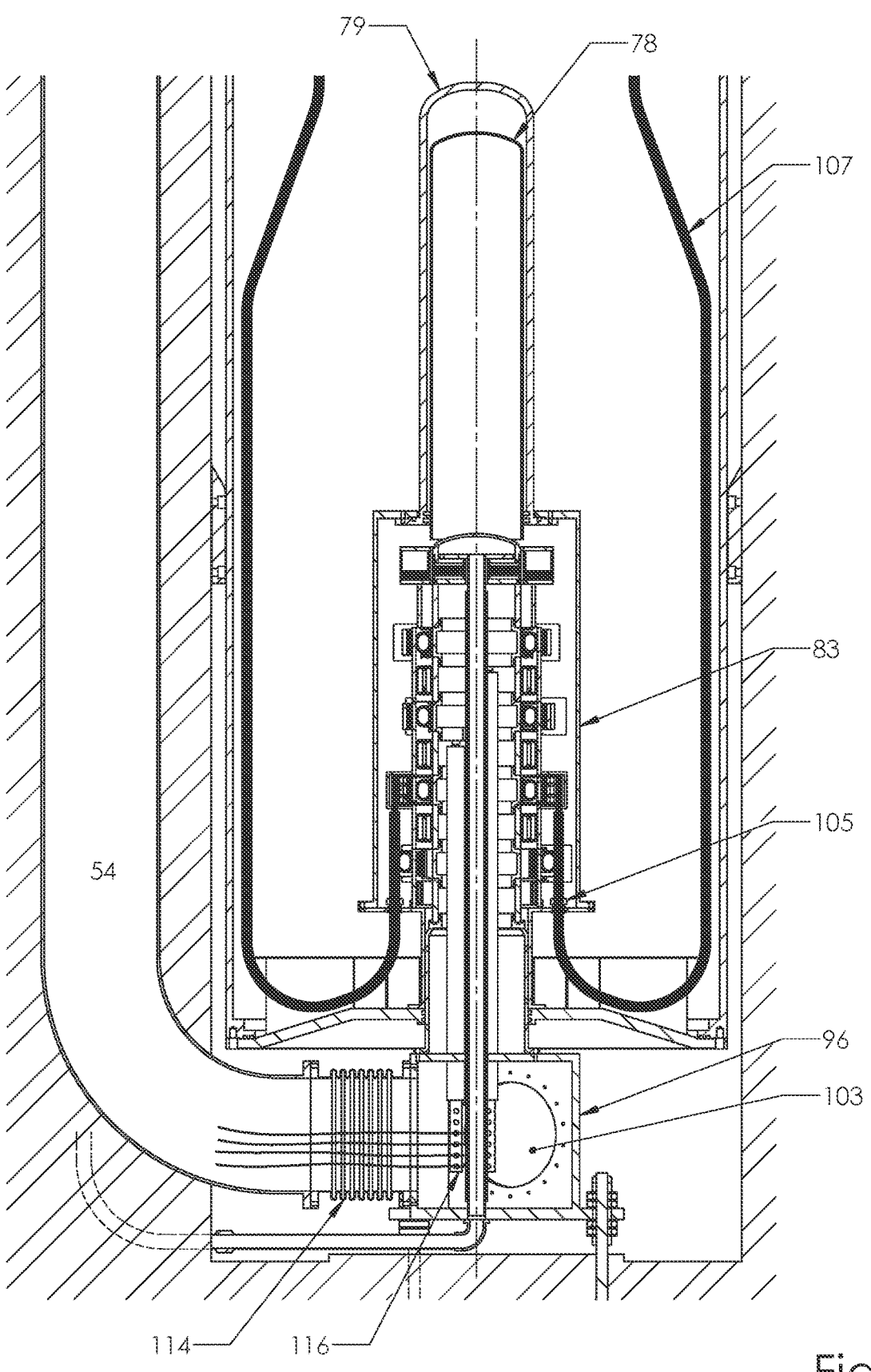
Figure 17:
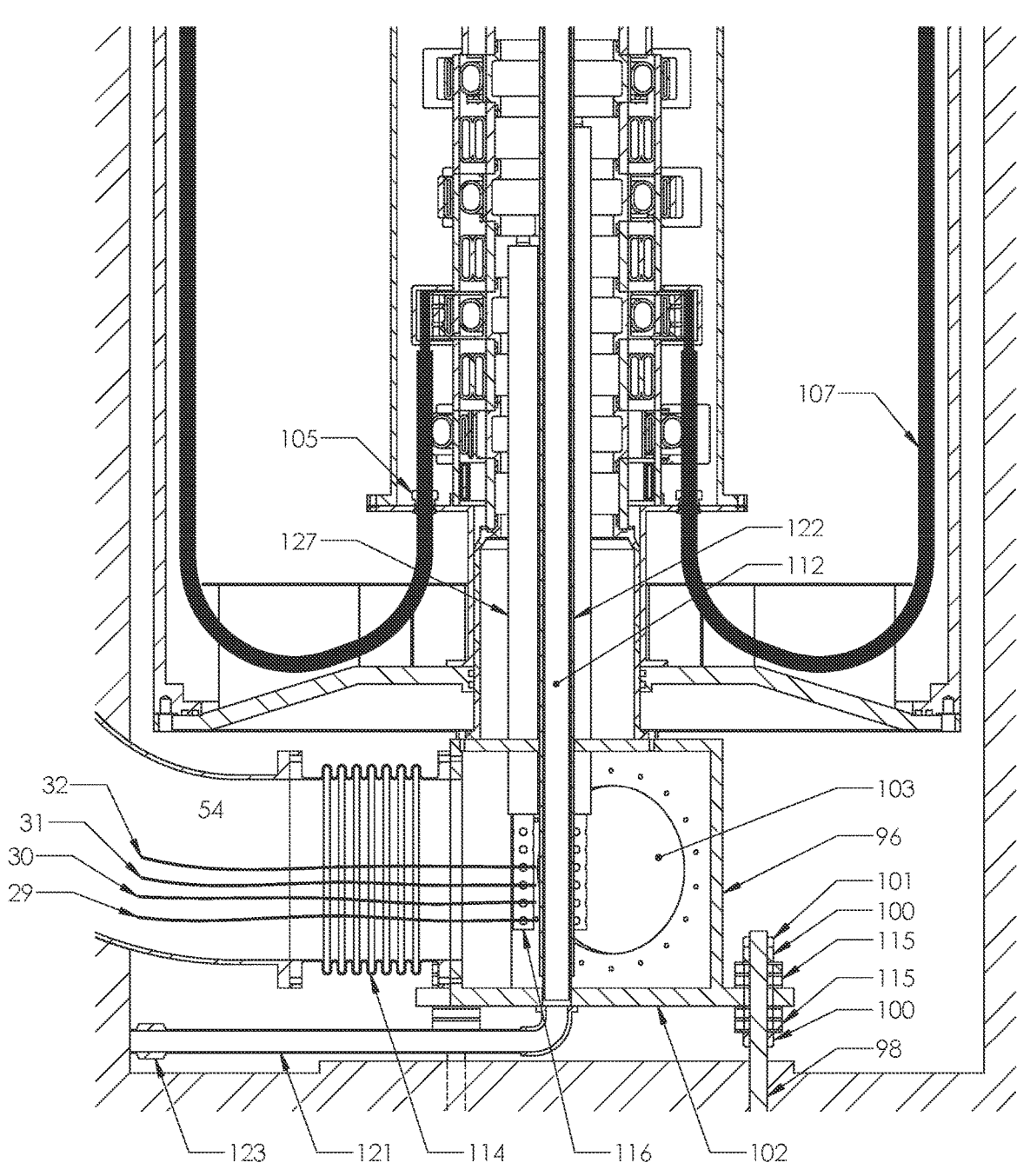
Figure 18:
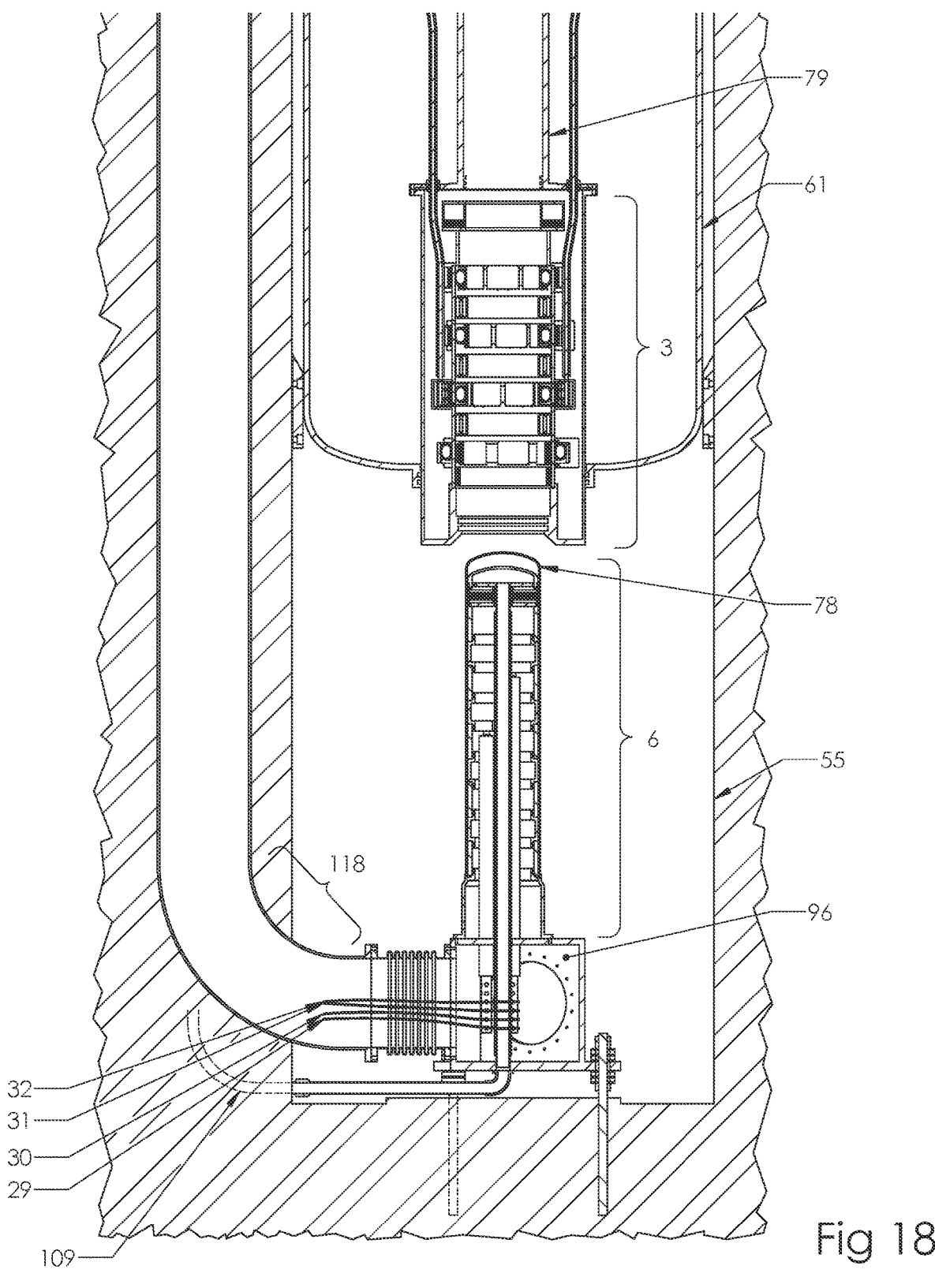
FIG. 18 is a section view of the electrical connector where the enclosure around the connector is a fully removable bell jar. The connector is not engaged.
Figure 19:
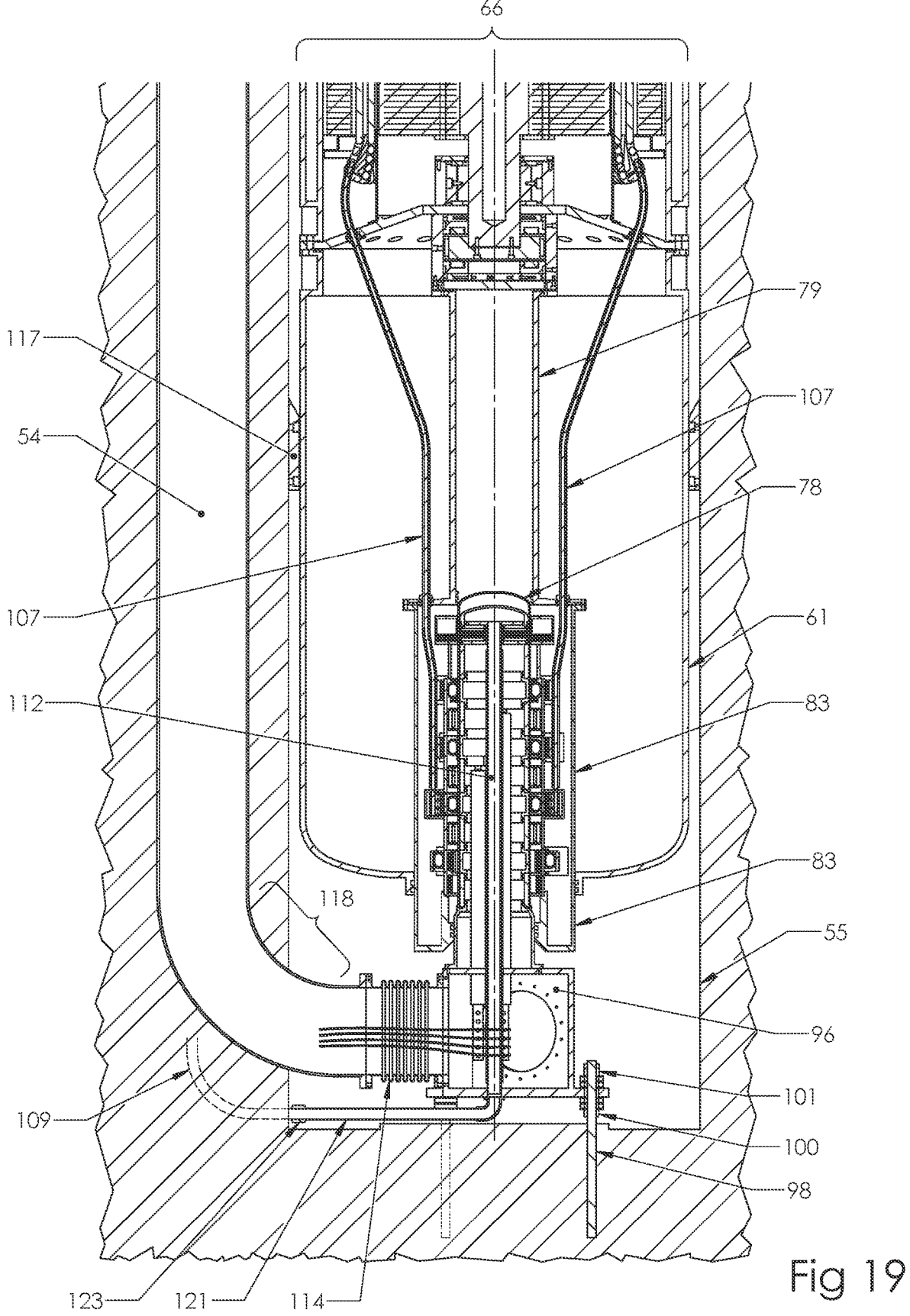
FIG. 19 is a section elevation of the electrical connector where the connector is partially engaged. The protective cover for the male connector is still surrounding the male connector.

Referring to FIGS. 13, 14, 15, 16 and 17, when the electrical connector is shown in the disengaged state as shown in FIG. 13, the female connector 3 is above the male connector 6. The male connector 6 is covered by a protective cap 78. When the connector is fully engaged (i.e. when the male connector 6 is fully mated into the female connector 3), the protective cap 78 will be raised to reside in the protective cap housing 79 as shown in FIGS. 15, 16 and 17.

In configurations of the disclosed technology, the electrical connector may be configured to prevent contact of the electrical connector plug with water and to also prevent water intrusion into the electrical connector receptacle. In configurations, this may be accomplished by providing the protective cap 78 to protect the electrical connector plug 6 from contact with river water when it is disengaged from the electrical connector receptacle. The protective cap 78 is configured to substantially cover the electrical terminals 44 of the male connector 6 when the male connector 6 is not mated to the female connector 3. As used in this context, "substantially cover" means largely or essentially surrounding to prevent water from contacting the electrical terminals 44 of the male connector 6, but without requiring a perfect seal. Protective cap 78 may be configured to slide off the electrical connector plug 6 once the electrical connector plug 6 is fully inserted into the electrical connector receptacle 3. Protective cap 78 may then be shifted using differential air pressure, for example, to a position within protective cap housing 79, located, for example, above electrical connector receptacle 3. This embodiment requires clearance between the inside diameter (ID) of the electrical connector receptacle 3 to be larger than the outside diameter (OD) of protective cap 78. This in turn requires that the inside diameter of the female connector be adjustable, i.e., allowing clearance between the OD of protective cap 78 and the interior elements of electrical connector receptacle 3, notwithstanding the ID of the protective cap 78 being larger than the OD of electrical connector plug 6.

Hence, in configurations the electrical connector plug 6 may be kept clean and dry when submerged by protective cap 78 with the aid of clean dry air supplied to the underside of protective cap 78 through electrical connector plug 6. The flow rate of such clean dry air (or other gas) could be adjusted to prevent water from entering the annular space between the male connector and the interior of the cap. Excessive flow rates should be avoided in order to not force the cap off of the male connector. Protective cap 78 may be secured against floating off electrical plug connector 6 by means of a detent or ballast weight, for example. An inflatable annular ring 106, for example, may be used as a detent to secure protective cap 78 against flotation. Such an inflatable annular ring may be operated with compressed air or other gas without the need to position any conductive components near the high Voltage conductors 29, 30, 31, and 32 identified in FIG. 4.

Additionally, it is desirable to exclude water from the auxiliary equipment enclosure 61. Water exclusion, with electrical connector plug 6 seated in electrical connector receptacle 3, may be achieved using O-rings 20 and 21 or the like. Water intrusion into auxiliary equipment enclosure 61, when the connectors are unmated, may be prevented by maintaining air (or other gas) pressure within the electrical connector receptacle housing 83 at a pressure above that of the water. In order to not have to so pressurize the entire auxiliary equipment enclosure, it may be more convenient to provide a pressurizable female connector enclosure, to which may be appended an enclosure for the male connector protective cap. These two enclosures are preferably removable and separable in order to provide maintenance access to the female connector assembly.

Shims 117 in well 55 align the unit before the male connector 6 engages with the female connector 3. Terminal box 96 includes access ports to provide internal access to busbars 116. Terminal box 96 is mounted on a base plate 102 which is mounted on anchor bolts 98. Flexible conduit connection 114 provides compliance so the male connector 6 can adjust during engagement. Cable to generator 107 runs from the female electrical connector 3, through pressure tight glands 150 in the electrical connector receptacle housing 83 to the generator above. Shims 117 fixed to the walls of "well" 55 in conjunction with guides 118 secured to the bottom of auxiliary equipment enclosure 61 accurately and repeatably align the electrical connector receptacle 3 with electrical connector plug 6. Angular alignment is achieved by adjusting anchor bolt nuts 100 and 101 on anchor bolts 98. Three anchor bolts are preferably used in order to achieve exact constraint with respect to angular alignment of electrical connector plug 6. Any remaining horizontal misalignment is accommodated by shear compliant rubber bearings 115 which may be constructed in a manner analogous to bridge bearings and earthquake isolation bearings with alternating layers of elastomer and high modulus membranes for preventing extrusion of compressed elastomer. Each bulbar is preferably enclosed in an insulating bushing 127 throughout its length. Flexible conduit connection 114 allows position and orientation adjustment of terminal box 96 relative to conduit 54 that may be rigidly embedded in concrete. Electrical cables 29, 30, 31, 32, etc. are compliant insofar as they are provided with slack where they turn from vertical to horizontal within conduit elbow 118. Three-phase power for equipment in auxiliary equipment enclosure 61, such as lubrication pumps, may be provided through a separate conduit 109 that may be located within conduit 54 or not. Conduit 109 may be entirely flexible, or it may be comprised of a combination of rigid and flexible sections. Alternatively, as illustrated, it may be comprised of embedded rigid section 109, connected to flexible cable 121 sealed by cable gland 123. Rigid conduit 112 is preferably fitted with a high Voltage rated insulating sleeve 122 over its full length.

Figures 25A, 25B:
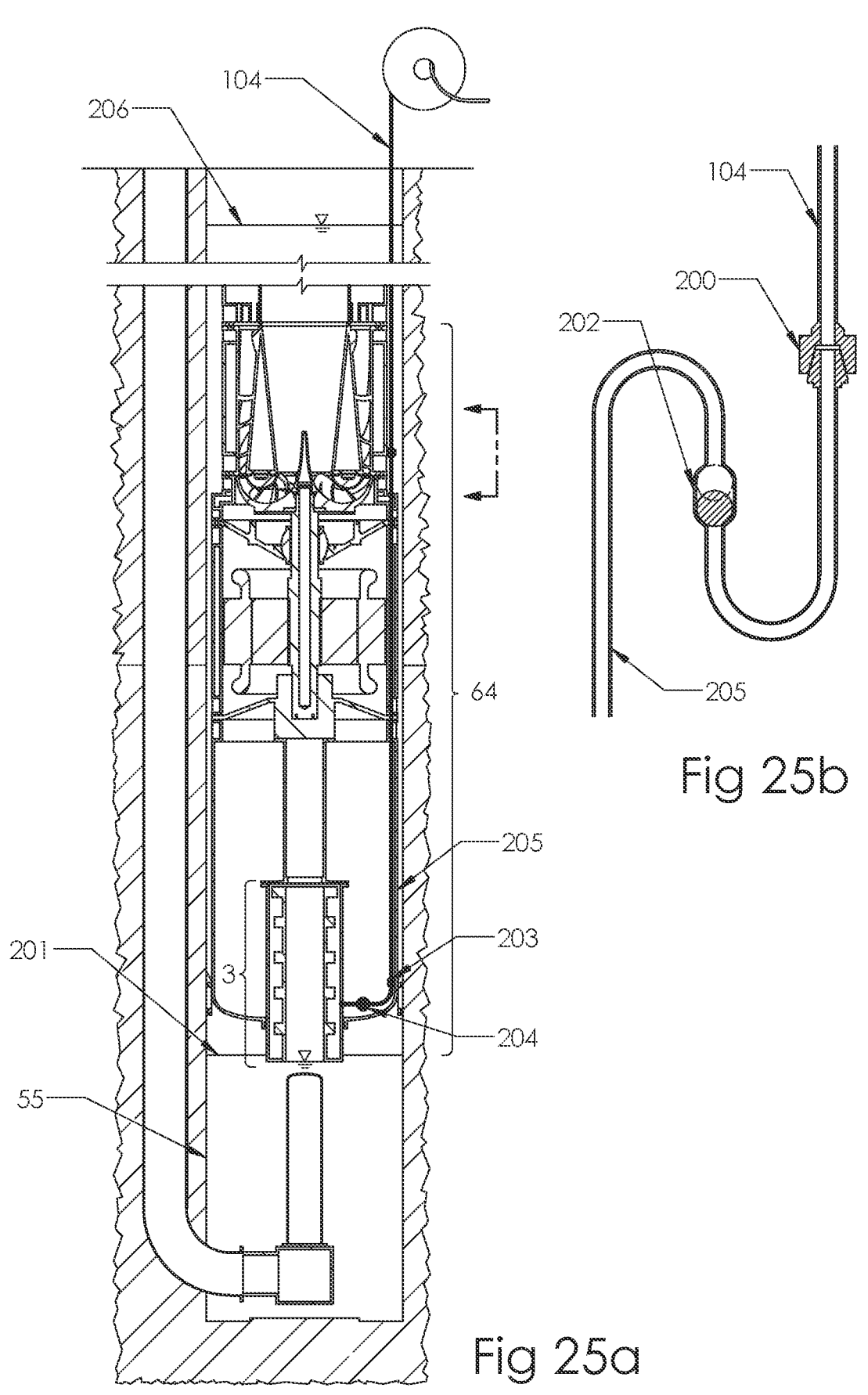
FIG. 25a is a section view of an example pump-turbine assembly being lowered in the well with temporary airline attached.
FIG. 25*b* is a detail view of a portion of the example pump-turbine assembly as indicated by the view lines in FIG. 25*a*.

Referring to FIGS. 25*a* and 25*b*, in configurations of the disclosed technology, a temporary air hose 104 may be connected to the pump turbine assembly as it is being lowered into the well. The temporary air hose 104 may be connected to the pump turbine assembly 64 with a modified air fitting held engaged by a weight 200 on the end of the hose 104. The weight is sufficient to overcome air pressure and maintain the connection as the connection drops below the free water level 206 in well 55. By this means dry compressed air may be supplied to the electrical connector receptacle housing 83, through a fixed airline 205 internal to the pump turbine assembly 64, as the pump turbine assembly 64 is being lowered into the well 55. This maintains depressed water surface 210 at the bottom of female electrical connector. As the pump turbine assembly 64 is lowered the water pressure underneath it increases and causes a decrease in the volume of air trapped above the free water surface at the bottom of the electrical connector receptacle 3. Makeup air thus supplied keeps the electrical connector receptacle housing 83 dry and full of air as the pump turbine assembly 64 is being lowered. Once the pump turbine assembly 64 is fully lowered, the O-rings 20 and 21 at the bottom of electrical connector receptacle 3 engage with male connector 2 surfaces, after which further supply of compressed air (or other gas) is not needed. The temporary air hose 104 may then be retrieved from above. Compressed air is then kept within the electrical connector receptacle housing 83 by a check valve 203 and solenoid isolation valve 204 within the pump turbine assembly. Water ingress through airline 205 is prevented by liquid shutoff valve 202.

Figure 20:
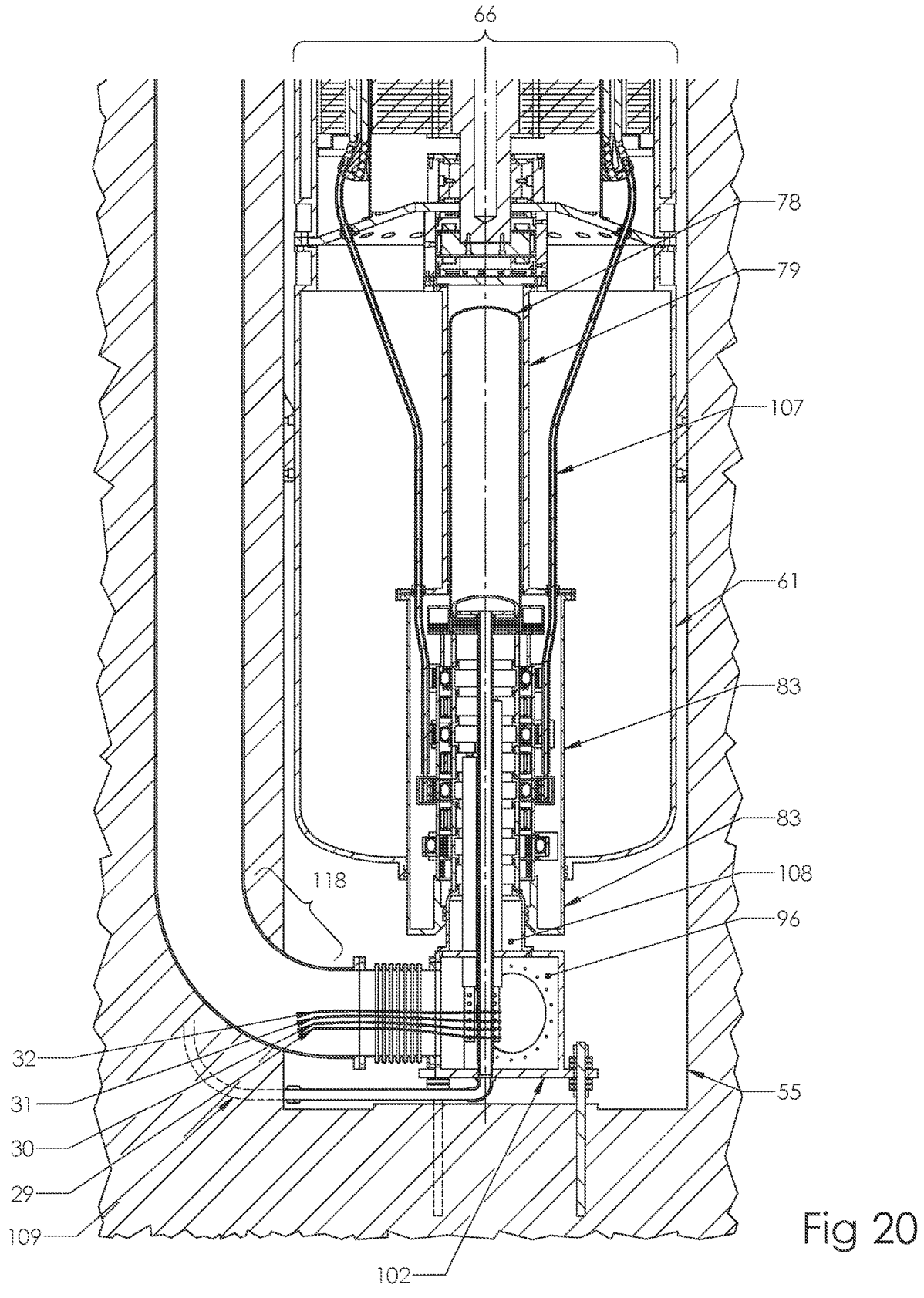
FIG. 20 is a section elevation view of the electrical connector where the connector is fully engaged.
Figure 21:
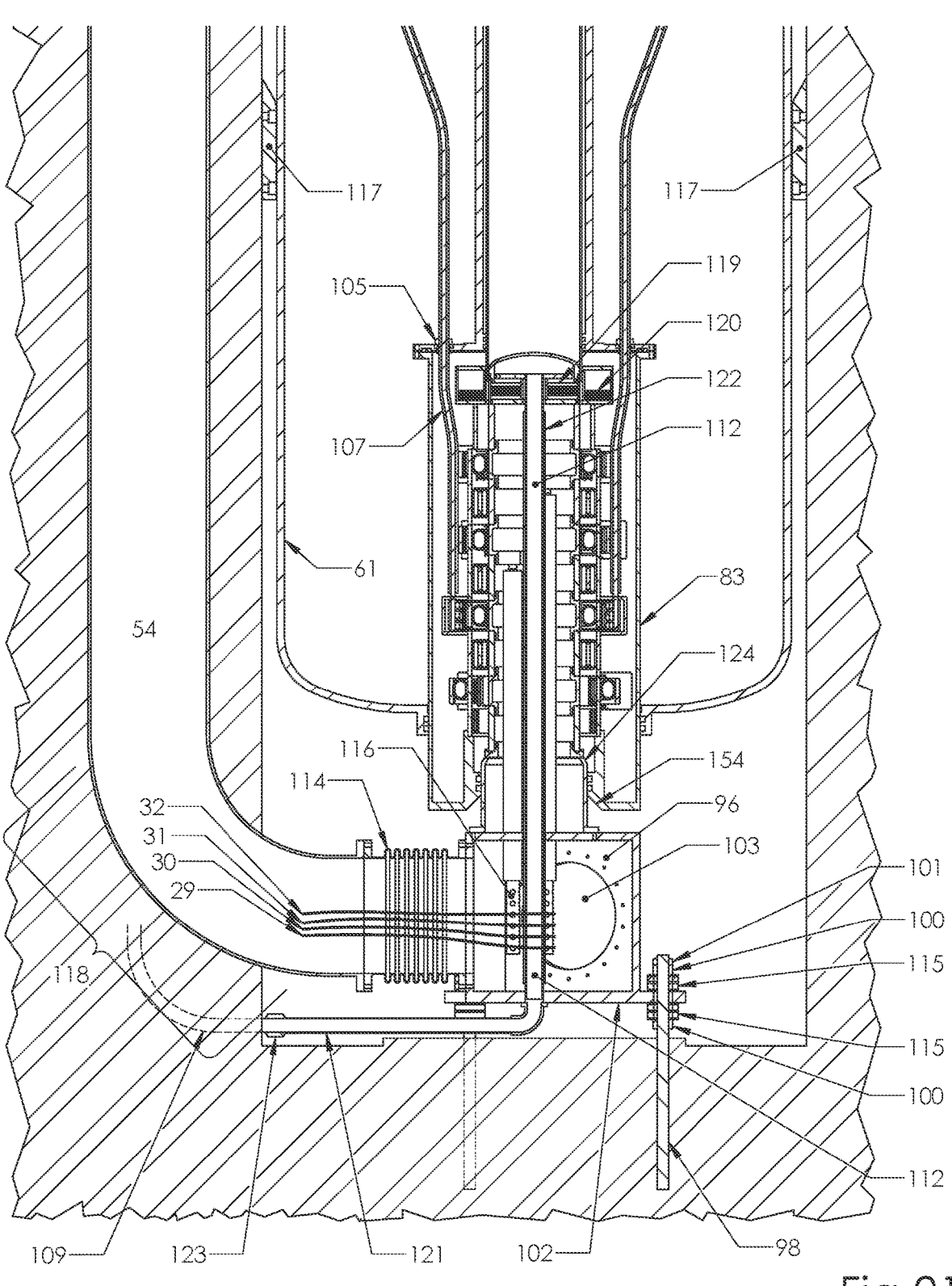
FIG. 21 is an enlarged section elevation view of the electrical connector where the connector is fully engaged.

Referring to FIGS. 18, 19, 20, and 21, an embodiment of the disclosed technology is illustrated. Auxiliary equipment enclosure 61 may be removed from motor generator 66 in the downward direction to provide service access to electrical connector receptacle 3 as well as to auxiliary equipment such as lubrication and control systems not shown. The removal of auxiliary equipment enclosure 61 from motor generator 66 would occur during maintenance once the unit is raised to the top of well 55. FIG. 21 illustrates the equipment in operating configuration with electrical contacts engaged and the protective cap in its raised and retracted position within protective cap housing 79. Terminal box 96 is mounted on a base plate 102 which is mounted on anchor bolts 98. Compliance in terminal box 96 base plate 102 mounting is achieved through shear compliant rubber bearings 115 attached to anchor bolts 98 using anchor bolt nuts 100 and 101 Flexible conduit connection 114 provides compliance so the male connector 6 can adjust during engagement. Cable 29, 30, 31, and 32 are flexible and run through elbow 118 before entering conduit 54. To not crowd the illustration only electrical cables 29, 30, 31, and 32 are shown in conduit 54. In practice there might be 6 cables per phase plus 2 cables for the neutral for a total of twenty power cables. This applies to the illustration of cables 107 between electrical connector receptacle 3 and motor generator 66. Likewise, in the case of the electrical connector plug 6, only one of four vertical busbars 116 is shown to not obscure the structure. Electrical cables 107, of which only 2 of perhaps 20 are shown, do not have to be disconnected to achieve access. Three-phase power for equipment in auxiliary equipment may be provided through a separate conduit 109 that may be located within conduit 54 or not. Conduit 109 may be entirely flexible, or it may be comprised of a combination of rigid and flexible sections. Alternatively, as illustrated, it may be comprised of embedded rigid section of conduit 109, connected to flexible cable 121 sealed by cable gland 123. It should connect at terminal box 96 to vertical conduit 112, which preferably also serves as a tensile member to tie together the stack of alternating electrical terminals 44, electrical insulators 46, and transformer primary side 119, where the three-phase (480 Volt, for example) electrical power cables within conduit 112 terminate. Rigid conduit 112 is preferably fitted with a high Voltage rated insulating sleeve 122 over its full length. Interior conical surface 154 at the bottom of the electrical connector receptacle housing 83 bears on exterior conical surface 124 of electrical connector plug 6 to bring the electrical connector receptacle 3 into precise alignment with electrical connector plug 6. Alignment is facilitated by the compliance of elastomeric bearings 115 and horizontal positioning effect of shims 117.

In configurations of the disclosed technology, electrical connector plug 6 may be mounted atop a watertight terminal box 96, preferably fitted with openings with removable watertight access covers 103 on each of its 4 vertical faces. One of these openings may be used to connect a conduit 54 for electrical cables and the like. The 3 other openings provide access to the terminal blocks at the base of each vertical bulbar. These openings are fitted with access covers 103 when the system is in service. Conduit 54 may be connected to the terminal box by means of a flexible coupling to allow adjustment of the position and orientation of the terminal box relative to the conduit which may be fixed and embedded in concrete. The terminal box, as well as the electrical connector plug 6, may be filled with a dielectric gas or fluid to provide electrical insulation and cooling. The pressure within the terminal box and male connector may be kept slightly above the pressure of the surrounding water in order to prevent water intrusion through any leaks. A pressure equalizing membrane, for example, may be used for this purpose.

Figure 22:
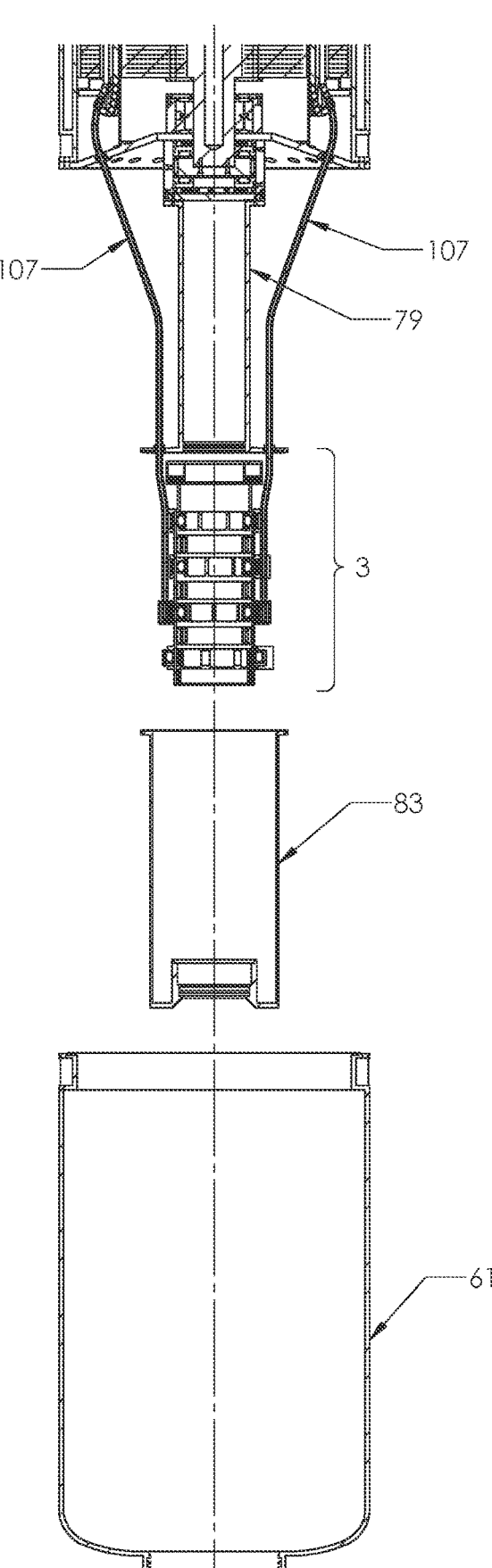
FIG. 22 is an exploded view of the electrical connector, the pressure boundary around the electrical connector, and the bell jar.

Referring to FIG. 22, an exploded view is shown for the auxiliary equipment enclosure 61, and electrical connector. This shows the electrical connector receptacle housing 83 separated from the auxiliary equipment enclosure and the electrical connector receptacle 3. The protective cap housing

79 also provides structural support of the electrical connector receptacle 3. Electrical cables 107 run along the outside of protective cap housing 79.

In configurations of the disclosed technology, the electrical connector receptacle 3 may be enclosed within a pressure rated and watertight enclosure: the electrical connector receptacle housing 83. This serves several purposes including: 1) Prevention of water intrusion into the auxiliary equipment enclosure in the case of loss of air (or other gas) pressure, 2) Application of vacuum to the female connector for the purpose of drying it out, should it ever be flooded with water and 3) Establishment of a pressure within the female connector different that the pressure within the auxiliary equipment enclosure, and 4) Use of a dielectric gas or liquid for the purpose of withstanding higher Voltages within the electrical connector. Said pressure rated and watertight enclosure may include an extension to house protective cap 78. In order to facilitate service of the electrical connector receptacle, wires, cables, hoses, fiber optic cables, etc. that must enter the enclosure may be fed through pressure tight glands 105 through the electrical connector receptacle housing 83. This bulkhead may include O-ring glands for sealing to the male connector and a flange connection for sealing to the pressure rated and watertight enclosure which may be lifted upwards to facilitate service access to the female electric connector. The enclosure for the protective cap may be configured to stay in place while allowing the pressure rated and watertight enclosure to be lifted up around it. This reduces the vertical clearance required above the female electrical connector.

In configurations of the disclosed technology, electrical connector receptacle housing 83 may be fitted with sensors for water detection, humidity measurement, dielectric strength measurement, pressure measurement, temperature measurement, smoke detection, arc detection, sound monitoring, video imaging, etc.

In configurations of the disclosed technology, and referring to FIGS. 20, 21, and 22, service access to the electrical connector receptacle 3 may be improved by configuring auxiliary equipment enclosure 61 to be removed downward from the pump turbine assembly 64 and thus providing nearly unobstructed service access to electrical connector receptacle 3. This solution is especially desirable in the case of small diameter auxiliary equipment enclosures that provide little, if any working space between the interior of auxiliary equipment enclosure 61 and electrical connector receptacle housing 83. In such a configuration it is desirable to mount auxiliary equipment at an elevation above electrical connector receptacle housing 83, while supporting it with a structure secured to the generator bulkhead above. In this manner such auxiliary equipment may simply be left connected and in place should access to the electrical connector receptacle be required.

Figures 23A, 23B:
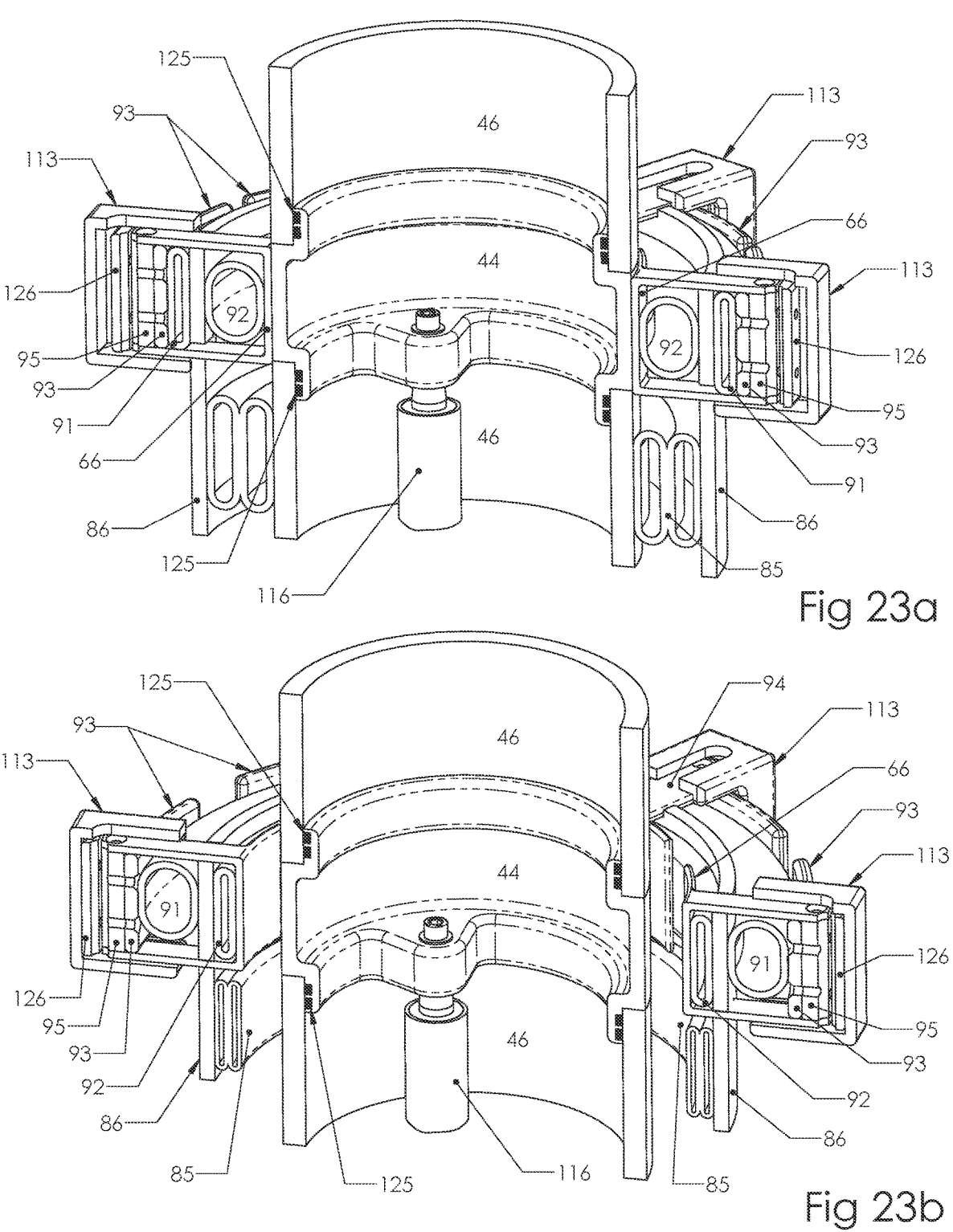
FIG. 23a is a section view detailing one conductor ring and the associated actuation system in the engaged state.
FIG. 23b is a section view detailing one conductor ring and the associated actuation system in the disengaged state.

Referring to FIGS. 23a and 23b, a portion of the electrical connector assembly, illustrating the connection of one phase, is shown in cutaway perspective view. FIG. 23a illustrates an open or disconnected connector. FIG. 23b illustrates a closed or connected connector. Electrically insulating bushings 46 separate electrical terminals 44. O-rings 125 create a seal between insulators 46 and terminals 44. The purpose of the seal is to keep water out, should water get past the protective cap and to keep dielectric fluid or gas within electrical connector plug 6. The O-rings also serve to center the insulating elements 46 with the electrical terminals 44 in spite of radial clearance that may be provided to allow for the higher coefficient of thermal expansion of the electrical terminals 44 (likely made of copper or an alloy thereof) relative to the insulating bushings 46 (likely made of ceramic or glass).

Receptacle contact shoes 66 are actuated by connect actuators 91. Actuation achieves two purposes, namely radial movement of the contact shoes from a position where they are clear of the protective cap to a position in contact with the electrical connector plug terminals, and establishment of contact pressure essential to a low resistance contact and minimal heat generation.

The clearance between electrical connector plug 6 and electrical connector receptacle 3 may switched between a connector mating configuration as shown in FIG. 23*b* and an electrical power conducting configuration as shown in FIG. 23*a*. The required configuration change is performed by "connect inflatable actuators" 91 and "disconnect inflatable actuators" 92, and inflatable insulators 85. The inflatable connect actuators 91 create a uniform contact pressure over the full arc length of each contact shoe. It should be noted that the disconnect actuators 92 must be deflated as the connect actuators 91 are inflated in order to achieve optimal contact pressure. Inflatable insulators 85 may also be provided to achieve higher breakdown Voltage and reduce the risk of an ionized track (due to incident ionizing radiation, for example) through gas adjacent the insulating bushings. While the membranes of the inflatable insulators provide significant Voltage withstand capability, they may also be inflated with a dielectric gas such as SF6 in order to maximize Voltage withstand capability. The inflatable insulators would normally be actuated (inflated) along with the connect actuators. Support tube 86 provides a surface against which connect actuators 91, disconnect actuators 92, and inflatable insulators 85 can react. Support tube 86 also serves as a mounting surface for the actuators and inflatable insulators and serves as a guide for the yokes 94 that electrically and mechanically connect contact shoes 66 with terminal blocks 95. Terminal blocks 95 are also bolted or otherwise connected to terminal block clamps 126 and yoke reaction plates 93. Yoke reaction plates 93 are preferably constructed of insulating material. Terminal block covers 113 provide insulation between terminal block clamps 126 and electrical connector receptacle housing 83. Busbar 116 is attached to electrical terminal 44 and extends down into terminal box 96 where electrical cables 29, 30, 31, 32, etc. are connected to the busbar. The 3 other busbars (typical) are not shown in the interest of not cluttering the drawing. Each busbar is preferably enclosed in an insulating bushing 127 (shown in FIG. 17) throughout its length.

In configurations of the disclosed technology, inflatable insulators 85 may be provided between electrical connector support tube 86 and each electric connector plug terminal 87 in order to achieve a greater margin of safety against dielectric breakdown without enlarging the apparatus beyond the confines of available space. The presence of inflatable insulators in tight contact with the surfaces of the male connector insulators increases the air gap distance subject to dielectric breakdown where an arc may otherwise be initiated by incident ionizing radiation, for example. Dielectric breakdown along the surface of the electrical connector plug 6 may be likewise suppressed by tight contact with the inflatable insulators.

Figure 24A:
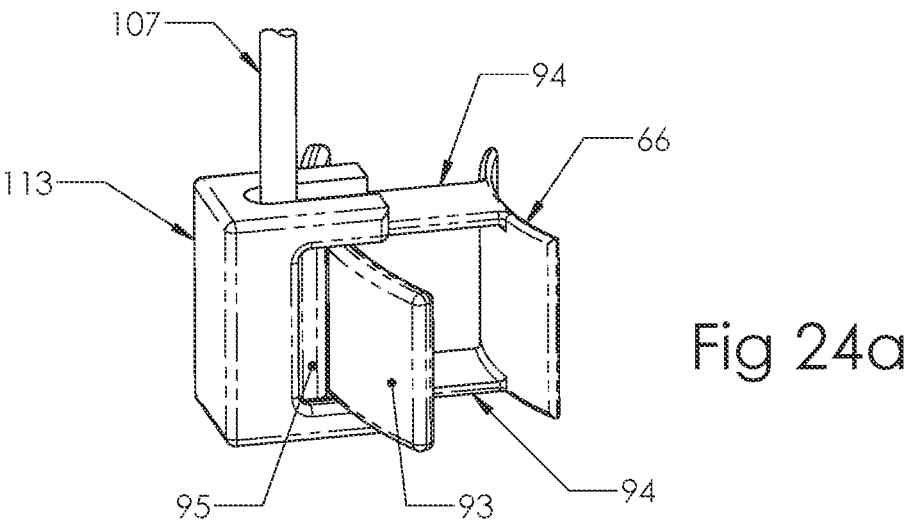
FIGS. 24a and 24b show a detailed view of the electrical contact system.
Figure 24B:
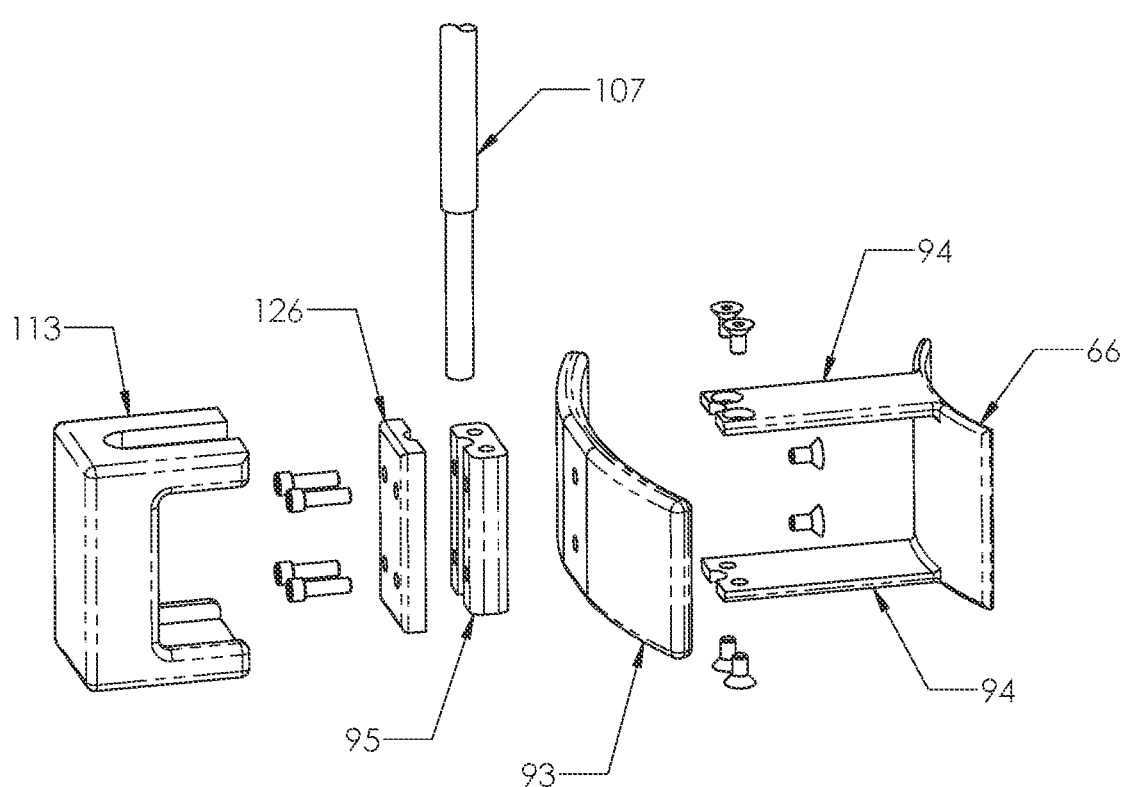

Referring to FIGS. 24*a* and 24*b*, show a detailed view of electrical contact system. The contact shoes 66 are connected to the terminal blocks 95 via yokes 94. Yoke reaction plates 93 are mounted to terminal blocks 95. Terminal block clamps 126 secure generator cable 107 to the terminal block

95. Terminal block covers 113 provide insulation surrounding terminal block clamps 126.

The connector may include, for example, contacts for each of three phases plus a contact for the neutral for use in conjunction with a star connected motor generator. Other connection arrangements, such as for a doubly fed asynchronous motor generator, may be accommodated by adding contacts. Radial actuation of the female connector contacts is desirable for several reasons including: 1) It is undesirable to drag soft conducting materials such as gold or copper against potentially abrasive insulators such as ceramic. The resulting deposition of conducting particles on an otherwise insulating surface can render the surface conductive and result in a short circuit. 2) The male connector with its protective cap is necessarily larger in diameter than the male connector itself. Insertion of the male connector with its protective cap thus requires extra clearance within the female connector. 3) High contact pressure within the electrical contacts minimizes contact resistance and heat generation and maximizes contact life expectancy and reliability. These requirements are met by a further embodiment of the disclosed technology, namely the provision of annular inflatable actuators for engaging and disengaging the electrical contacts. The inflatable actuators have a preferably flat cross section when deflated a generally toroidal shape when inflated. It is preferable that they are endless, i.e., they extend a continuous 360 degrees around the connector without terminations or splices. Stress relief inserts may be incorporated to reduce stresses in the elastomer when inflated. The inflatable actuators for making contact will hereinafter be referred to as connect actuators 91. In a preferred embodiment, these exert, when inflated, an inward force directly on the outer diameter of the electrical receptacle contacts 89 while exerting an outward force on the inside of the receptacle support tube 86. Other annular inflatable actuators, hereinafter referred to as disconnect actuators 92, exert when inflated an inward force on the exterior of receptacle support tube 86 while exerting an outward force on each yoke reaction plate 93. Electrical receptacle contacts 89 may be integral with generally radial conductors that form yokes 94. Each yoke 94 may incorporate a terminal block 95 which may in turn be connected to a yoke reaction plate 93. This arrangement provides for the simultaneous radially inward or simultaneous radially outward movement as required of all of the electrical receptacle contacts 89 within electrical receptacle 3 using simple pneumatic control unaffected by high Voltages.

Hence, in accordance with one aspect of the disclosed technology, the water level within the female connector may be kept suppressed by the supply of pressurized air into the connector.

In accordance with a further aspect of the disclosed technology, a powered cleaning brush may be provided for the purpose of cleaning off the male connector assembly.

In accordance with a further aspect of the disclosed technology an integral air knife may be incorporated for the purpose of removing excess water from either the male or female connector assemblies.

In accordance with a further aspect of the disclosed technology, an inductive coupling may be provided in order to supply low-voltage power through the same connector as is used for high-voltage power, while avoiding the risk of introducing high voltage to the low-voltage terminals.

In accordance with a further aspect of the disclosed technology, an optical data pathway or bus may be provided in order to pass signals without risk of high voltages being introduced to the data circuits.

In accordance with a further aspect of the disclosed technology a guide means may be provided that angularly aligns the male and female connectors without the application of large forces to the terminals of the connectors.

In accordance with a further aspect of the disclosed technology, elastomeric bearings, like elastomeric bridge bearings, may be used in order to keep the male connector vertical while allowing it to self-align with the female connector by way of shear deformation of the elastomeric bridge bearings.

In accordance with a further aspect of the disclosed technology, the male connector may remain enclosed in a sheath when not mated. Such a sheath may take the form of a telescoping assembly, a bellows, or a folding membrane, for example.

In accordance with a further aspect of the disclosed technology the male connector may be automatically covered with a protective cap when not mated.

In accordance with a further aspect of the disclosed technology, such a protective cap may be purged of water by means of pressurized air or other gas.

In accordance with a further aspect of the disclosed technology, the interior of the male conductor may be filled with a dielectric fluid or gas.

In accordance with a further aspect of the disclosed technology, the female connector may be filled with a dielectric fluid or gas. Such dielectric fluid or gas may fill the space between male and female connectors, or not. Dielectric fluids may be similar to transformer oil or may have an elevated melting point such that, if leaked into river water, would solidify and be easy to recover.

In accordance with a further aspect of the disclosed technology an apparatus is provided for connecting submerged three-phase high-voltage circuits comprising a generally cylindrical male connector that mates with corresponding female connector, wherein the electrical contacts between the male and female connectors may be dried under vacuum and backfilled with a dielectric gas or fluid.

In accordance with a further aspect of the disclosed technology, drying under vacuum may be assisted by the activation of heaters.

In accordance with a further aspect of the disclosed technology, the apparatus above is provided that further comprises a magnetic auxiliary power coupling.

In accordance with a further aspect of the disclosed technology the apparatus above is provided that further comprises an optical data link.

In accordance with a further aspect of the disclosed technology the apparatus above is provided that further comprises a magnetic auxiliary power coupling and an optical data link.

In accordance with a further aspect of the disclosed technology an apparatus as above is provided that further comprises a plurality of shear compliant mounts that permit lateral alignment of the male and female connectors while preventing angular misalignment of the male and female connectors.

In accordance with a further aspect of the disclosed technology an apparatus as above described is provided wherein the contact pressure between mating contacts may be increased for transmission of electrical power and decreased or eliminated during connector mating and de-mating.

In accordance with a further aspect of the disclosed technology, an apparatus is provided wherein the water level in the female connector may be suppressed by the use of air or gas pressure in order to occlude water and debris from the de-mated female connector.

In accordance with a further aspect of the disclosed technology an apparatus as above described is provided further comprising a rotary brush attached to the female connector that may be used to clean the male connector prior to mating. The rotary brush may be powered by water which also serves to carry away dirt.

In accordance with a further aspect of the disclosed technology an apparatus as described above is provided wherein the dielectric fluid may be pumped through a water scavenging device while the connector is carrying electrical power.

Accordingly, the disclosed technology relates to submersible connectors for a combination high-voltage electrical power, low-voltage electrical power, electrical signals, and optical signals. The technology extends the capability of such connectors to higher power levels than prior technologies, 100 MW, for example, while also enhancing reliability with the addition of active water-level suppression and active cleaning mechanisms to prevent the retention of hydroscopic fibers, for example, that might otherwise span the insulators. The technology includes male and female connection elements that may be mated and unmated while achieving current carrying capacity of thousands of amperes and voltage withstand capability of tens of thousands of volts, in combination with the ability to simultaneously provide a low-voltage three-phase power connection of 480 volts AC at 100 amperes, for example, in combination with an optical signal connection.

EXAMPLES

Illustrative examples of the disclosed technologies are provided below. A particular configuration of the technologies may include one or more, and any combination of, the examples described below.

Example 1 includes a submersible, high-voltage electrical connector comprising: a female connector having an interior chamber and a conduit configured to connect the interior chamber to an evacuation pump; and a male connector configured to fit within the chamber of the female connector, the conduit of the female connector further configured to, when the male connector and the female connector are mated, substantially evacuate any liquid from the chamber of the female connector.

Example 2 includes the electrical connector of Example 1, in which the conduit of the female connector is further configured to connect the chamber to a dielectric-fluid supply, the conduit of the female connector further configured to, when the male connector and the female connector are mated, substantially fill the chamber of the female connector with dielectric fluid.

Example 3 includes the electrical connector of any of Examples 1-2, in which the chamber of the female connector is substantially cylindrical and the male connector is substantially cylindrical.

Example 4 includes the electrical connector of any of Examples 1-3, further comprising a three-phase transformer to inductively couple electrical power between the male connector and the female connector.

Example 5 includes the electrical connector of Example 4, in which the three-phase transformer comprises one or more female connector coils configured to induce a magnetic field in a male connector core, in a female connector core, and across a dielectric gap.

Example 6 includes the electrical connector of any of Examples 1-5, further comprising a two-way optical data link between the male connector and the female connector.

Example 7 includes the electrical connector of any of Examples 1-6, in which the female connector further comprises a rotary brush configured to remove debris from the male connector as the male connector is mated to the female connector.

Example 8 includes the electrical connector of Example 7, in which the rotary brush is powered by impulse turbine buckets that are powered by one or more water jets.

Example 9 includes the electrical connector of any of Examples 7-8, in which the rotary brush is at an entrance to the interior chamber of the female connector.

Example 10 includes the electrical connector of any of Examples 1-9, in which the female connector further comprises an air knife configured to blow compressed air to remove water and debris from the male connector as the male connector is mated to the female connector.

Example 11 includes the electrical connector of Example 10, in which the air knife is at an entrance to the interior chamber of the female connector.

Example 12 includes the electrical connector of any of Examples 1-11, the female connector further comprising an electrical terminal configured to substantially encircle the male connector when the male connector is mated to the female connector, the electrical terminal further configured to increase in circumference in a first configuration to reduce contact pressure between the electrical terminal and the male connector during mating and decoupling of the male connector and the female connector, and the electrical terminal further configured to reduce in circumference in a second configuration to increase contact pressure between the electrical terminal and the male connector when the male connector and the female connector are mated.

Example 13 includes the electrical connector of Example 12, the electrical terminal including an inflatable actuator configured to expand to transition the electrical terminal from the second configuration to the first configuration.

Example 14 includes the electrical connector of Example 13, in which the inflatable actuator is configured to deflate to transition the electrical terminal from the first configuration to the second configuration, the electrical terminal also including a spring configured to transition the electrical terminal from the first configuration to the second configuration.

Example 15 includes the electrical connector of any of Examples 1-14, in which the male connector further comprises a protective cap configured to substantially cover electrical terminals of the male connector when the male connector is not mated to the female connector and to translate to expose the electrical terminals of the male connector when the male connector is mated to the female connector.

Example 16 includes a pump-turbine, motor-generator assembly comprising: a pump-turbine configured to operate as a pump when fluid passes through the pump-turbine in a first direction and as a turbine when fluid passes through the pump-turbine in a second direction, opposite to the first direction; a motor-generator configured to operate as a motor to drive the pump-turbine when fluid passes through the pump-turbine in the first direction and as a generator of electrical power when fluid passes through the pump-turbine in the second direction; and a submersible, electrical connector configured to convey electrical power between the motor-generator and an electrical junction that is external to the pump-turbine, motor-generator assembly, the electrical connector comprising: a female connector having an interior chamber and a conduit configured to connect the interior chamber to an evacuation pump, and a male connector configured to fit within the chamber of the female connector, the conduit of the female connector further configured to, when the male connector and the female connector are mated, substantially evacuate any liquid from the chamber of the female connector.

Example 17 includes the pump-turbine, motor-generator assembly of Example 16, in which the conduit of the female connector is further configured to connect the chamber to a dielectric-fluid supply, the conduit of the female connector further configured to, when the male connector and the female connector are mated, substantially fill the chamber of the female connector with dielectric fluid.

Example 18 includes the pump-turbine, motor-generator assembly of any of Examples 16-17, further comprising a three-phase transformer to inductively couple electrical power between the male connector and the female connector.

Example 19 includes the pump-turbine, motor-generator assembly of any of Examples 16-18, further comprising a two-way optical data link between the male connector and the female connector.

Example 20 includes the pump-turbine, motor-generator assembly of any of Examples 16-19, in which the female connector further comprises a rotary brush powered by impulse turbine buckets and configured to remove debris from the male connector as the male connector is mated to the female connector.

Example 21 includes the pump-turbine, motor-generator assembly of any of Examples 16-21, in which the female connector further comprises an air knife configured to blow compressed air to remove water and debris from the male connector as the male connector is mated to the female connector.

Example 22 includes the pump-turbine, motor-generator assembly of any of Examples 16-21, the female connector further comprising an electrical terminal configured to substantially encircle the male connector when the male connector is mated to the female connector, the electrical terminal further configured to increase in circumference in a first configuration to reduce contact pressure between the electrical terminal and the male connector during mating and decoupling of the male connector and the female connector, and the electrical terminal further configured to reduce in circumference in a second configuration to increase contact pressure between the electrical terminal and the male connector when the male connector and the female connector are mated.

Example 23 includes the pump-turbine, motor-generator assembly of any of Examples 16-22, in which the male connector further comprises a protective cap configured to substantially cover electrical terminals of the male connector when the male connector is not mated to the female connector and to translate to expose the electrical terminals of the male connector when the male connector is mated to the female connector.

Example 24 includes the pump-turbine, motor-generator assembly of any of Examples 16-23, in which the male connector is mounted to a fixed surface through at least three bridge-bearing supports, the bridge-bearing supports each comprising alternating layers of metal disks and elastomeric disks.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "up," and "down" are used for convenience and in reference to the views provided in the drawings. But the disclosed technology may have a number of orientations in actual use. Thus, a feature that is vertical, horizontal, up, or down in the drawings may not have that same orientation or direction in all actual uses.

Although specific example configurations have been described for purposes of illustration, it will be understood that various modifications may be made without departing from the spirit and scope of the disclosure.

We claim:

1. A submersible, high-voltage electrical connector comprising:
   a female connector having an interior chamber and a conduit configured to connect the interior chamber to an evacuation pump;
   a male connector configured to fit within the chamber of the female connector, the conduit of the female connector further configured to, when the male connector and the female connector are mated, substantially evacuate any liquid from the chamber of the female connector; and
   a three-phase transformer to inductively couple electrical power between the male connector and the female connector, the three-phase transformer comprising one or more female connector coils configured to induce a magnetic field in a male connector core, in a female connector core, and across a dielectric gap.

2. A submersible, high-voltage electrical connector comprising:
   a female connector having an interior chamber and a conduit configured to connect the interior chamber to an evacuation pump; and
   a male connector configured to fit within the chamber of the female connector, the conduit of the female connector further configured to, when the male connector and the female connector are mated, substantially evacuate any liquid from the chamber of the female connector,
   the female connector further comprising a rotary brush configured to remove debris from the male connector as the male connector is mated to the female connector, in which the rotary brush is powered by impulse turbine buckets that are powered by one or more water jets.

3. A submersible, high-voltage electrical connector comprising:
   a female connector having an interior chamber and a conduit configured to connect the interior chamber to an evacuation pump; and
   a male connector configured to fit within the chamber of the female connector, the conduit of the female connector further configured to, when the male connector and the female connector are mated, substantially evacuate any liquid from the chamber of the female connector,
   the female connector further comprising an electrical terminal configured to:
      substantially encircle the male connector when the male connector is mated to the female connector,
      increase in circumference in a first configuration to reduce contact pressure between the electrical terminal and the male connector during mating and decoupling of the male connector and the female connector, and
      reduce in circumference in a second configuration to increase contact pressure between the electrical terminal and the male connector when the male connector and the female connector are mated, and
   the electrical terminal including an inflatable actuator configured to expand to transition the electrical terminal from the second configuration to the first configuration.

4. The electrical connector of claim 3, in which the inflatable actuator is configured to deflate to transition the electrical terminal from the first configuration to the second configuration, the electrical terminal also including a spring configured to transition the electrical terminal from the first configuration to the second configuration.

5. A pump-turbine, motor-generator assembly comprising:
   a pump-turbine configured to operate as a pump when fluid passes through the pump-turbine in a first direction and as a turbine when fluid passes through the pump-turbine in a second direction, opposite to the first direction;
   a motor-generator configured to operate as a motor to drive the pump-turbine when fluid passes through the pump-turbine in the first direction and as a generator of electrical power when fluid passes through the pump-turbine in the second direction; and
   a submersible, electrical connector configured to convey electrical power between the motor-generator and an electrical junction that is external to the pump-turbine, motor-generator assembly, the electrical connector comprising:
      a female connector having an interior chamber and a conduit configured to connect the interior chamber to an evacuation pump, and
      a male connector configured to fit within the chamber of the female connector, the conduit of the female connector further configured to, when the male connector and the female connector are mated, substantially evacuate any liquid from the chamber of the female connector,
   in which the female connector further comprises a rotary brush powered by impulse turbine buckets and configured to remove debris from the male connector as the male connector is mated to the female connector.

6. A pump-turbine, motor-generator assembly comprising:
   a pump-turbine configured to operate as a pump when fluid passes through the pump-turbine in a first direction and as a turbine when fluid passes through the pump-turbine in a second direction, opposite to the first direction;

a motor-generator configured to operate as a motor to drive the pump-turbine when fluid passes through the pump-turbine in the first direction and as a generator of electrical power when fluid passes through the pump-turbine in the second direction; and a submersible, electrical connector configured to convey electrical power between the motor-generator and an electrical junction that is external to the pump-turbine, motor-generator assembly, the electrical connector comprising:

a female connector having an interior chamber and a conduit configured to connect the interior chamber to an evacuation pump, and a male connector configured to fit within the chamber of the female connector, the conduit of the female connector further configured to, when the male connector and the female connector are mated, substantially evacuate any liquid from the chamber of the female connector, in which the male connector is mounted to a fixed surface through at least three bridge-bearing supports, the bridge-bearing supports each comprising alternating layers of metal disks and elastomeric disks.

7. The electrical connector of claim 1, in which the conduit of the female connector is further configured to connect the chamber to a dielectric-fluid supply, the conduit of the female connector further configured to, when the male connector and the female connector are mated, substantially fill the chamber of the female connector with dielectric fluid.

8. The electrical connector of claim 1, in which the chamber of the female connector is substantially cylindrical and the male connector is substantially cylindrical.

9. The electrical connector of claim 1, further comprising a three-phase transformer to inductively couple electrical power between the male connector and the female connector.

10. The electrical connector of claim 1, further comprising a two-way optical data link between the male connector and the female connector.

11. The electrical connector of claim 1, the female connector further comprising an electrical terminal configured to substantially encircle the male connector when the male connector is mated to the female connector, the electrical terminal further configured to increase in circumference in a first configuration to reduce contact pressure between the electrical terminal and the male connector during mating and decoupling of the male connector and the female connector, and the electrical terminal further configured to reduce in circumference in a second configuration to increase contact pressure between the electrical terminal and the male connector when the male connector and the female connector are mated.

12. The electrical connector of claim 1, in which the male connector further comprises a protective cap configured to substantially cover electrical terminals of the male connector when the male connector is not mated to the female connector and to translate to expose the electrical terminals of the male connector when the male connector is mated to the female connector.

13. The electrical connector of claim 3, in which the conduit of the female connector is further configured to connect the chamber to a dielectric-fluid supply, the conduit of the female connector further configured to, when the male connector and the female connector are mated, substantially fill the chamber of the female connector with dielectric fluid.

14. The electrical connector of claim 3, in which the chamber of the female connector is substantially cylindrical and the male connector is substantially cylindrical.

15. The electrical connector of claim 3, further comprising a three-phase transformer to inductively couple electrical power between the male connector and the female connector.

16. The electrical connector of claim 3, further comprising a two-way optical data link between the male connector and the female connector.

17. The electrical connector of claim 3, the female connector further comprising an electrical terminal configured to substantially encircle the male connector when the male connector is mated to the female connector, the electrical terminal further configured to increase in circumference in a first configuration to reduce contact pressure between the electrical terminal and the male connector during mating and decoupling of the male connector and the female connector, and the electrical terminal further configured to reduce in circumference in a second configuration to increase contact pressure between the electrical terminal and the male connector when the male connector and the female connector are mated.

18. The electrical connector of claim 3, in which the male connector further comprises a protective cap configured to substantially cover electrical terminals of the male connector when the male connector is not mated to the female connector and to translate to expose the electrical terminals of the male connector when the male connector is mated to the female connector.

19. The pump-turbine, motor-generator assembly of claim 6, the female connector further comprising an electrical terminal configured to substantially encircle the male connector when the male connector is mated to the female connector, the electrical terminal further configured to increase in circumference in a first configuration to reduce contact pressure between the electrical terminal and the male connector during mating and decoupling of the male connector and the female connector, and the electrical terminal further configured to reduce in circumference in a second configuration to increase contact pressure between the electrical terminal and the male connector when the male connector and the female connector are mated.

20. The pump-turbine, motor-generator assembly of claim 6, in which the male connector further comprises a protective cap configured to substantially cover electrical terminals of the male connector when the male connector is not mated to the female connector and to translate to expose the electrical terminals of the male connector when the male connector is mated to the female connector.

* * * * *